US008498200B2

(12) United States Patent
Das et al.

(10) Patent No.: US 8,498,200 B2

(45) Date of Patent: *Jul. 30, 2013

(54) DETECTION OF ACTIVE NODES, SAFE NODE REMOVAL CONDITIONS, AND CROSS-CABLING CONDITIONS FOR MAINTENANCE OPERATIONS WITHIN A MULTI-CHASSIS ROUTING MATRIX

(75) Inventors: Kaushik Das, San Jose, CA (US); Rajagopalan Sivaramakrishnan, Sunnyvale, CA (US); Sameer Seth, Bangalore (IN); Sriram Raghunathan, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,770

(22) Filed: May 8, 2012

(65) Prior Publication Data

US 2012/0218996 A1 Aug. 30, 2012

Related U.S. Application Data

(63) Continuation of application No. 12/699,565, filed on Feb. 3, 2010, now Pat. No. 8,238,230.

(51) Int. Cl.
*H04L 12/26* (2006.01)

(52) U.S. Cl.
USPC ............................ 370/217; 370/248; 370/389

(58) Field of Classification Search
None
See application file for complete search history.

(56) References Cited

U.S. PATENT DOCUMENTS 4,774,703 A 9/1988 Force et al.
6,667,955 B1 * 12/2003 Blanc et al. .................. 370/220

(Continued)

OTHER PUBLICATIONS

Juniper Networks, Inc., "M320 Flexible PIC Concentrator (FPC) Description," Sep. 26, 2009, 4 pages.

(Continued)

*Primary Examiner* — Min Jung
(74) *Attorney, Agent, or Firm* — Harrity & Harrity, LLP

(57) ABSTRACT

A system includes a first device connected to a second device The first device includes a second node connected to a first node and the second device via a link, and includes a backup second node connected to the first node and the second device via another link. The first node is configured to receive, via the link or the other link, a group of packets (i.e., "packets"), from the second device; display a first notification that the second node can be removed when the packets are received via only the other link; display a second notification indicating that the backup second node can be removed when the packets are received via only the link; and display a third notification indicating that neither the second node nor the backup second node can be removed when the packets are not received via only the link and via only the other link.

20 Claims, 13 Drawing Sheets

U.S. PATENT DOCUMENTS

| | | | | |
|---|---|---|---|---|
| 6,680,904 | B1 * | 1/2004 | Kaplan et al. | 370/217 |
| 6,862,288 | B2 | 3/2005 | Sharma et al. | |
| 7,355,983 | B2 | 4/2008 | Scudder et al. | |
| 7,813,264 | B2 * | 10/2010 | Haq et al. | 370/217 |
| 7,911,940 | B2 * | 3/2011 | Shei | 370/219 |
| 8,238,230 | B2 * | 8/2012 | Das et al. | 370/217 |
| 2003/0117949 | A1 | 6/2003 | Moller et al. | |
| 2006/0215547 | A1 | 9/2006 | Koppol | |
| 2009/0154342 | A1 | 6/2009 | Oltman et al. | |
| 2011/0188387 | A1 | 8/2011 | Das et al. | |

OTHER PUBLICATIONS

Juniper Networks, Inc., "TX Matrix Plus Routing Engine Description," Aug. 28, 2009, 1 page.

Juniper Networks, Inc., "Displaying the Status of Control Board Ethernet Switch Ports in a Routing Matrix with a TX Matrix Plus Router," Oct. 20, 2009, 3 pages.

Juniper Networks, Inc., "Control Plane Connections from the TX Matrix Plus Router to the T1600 Routers," Aug. 28, 2009, 2 pages.

* cited by examiner

700

CURRENT NODE STATUS TABLE 710 715

705

| SOURCE NODE | PRIMARY I/F | SECONDARY I/F |
|---|---|---|
| LCC 120-1/RE 325-1 | X | |
| LCC 120-1/FPC 310-1 | X | |
| LCC 120-1/FPC 310-2 | X | |
| LCC 120-2/RE 325-1 | X | |
| LCC 120-2/RE 310-1 | X | |
| LCC 120-2/RE 310-2 | X | |

CURRENT NODE STATUS TABLE 710 715

705

| SOURCE NODE | PRIMARY I/F | SECONDARY I/F |
|---|---|---|
| LCC 120-1/RE 325-1 | | X |
| LCC 120-1/FPC 310-1 | | X |
| LCC 120-1/FPC 310-2 | | X |
| LCC 120-2/RE 325-1 | | X |
| LCC 120-2/RE 310-1 | | X |
| LCC 120-2/RE 310-2 | | X |

CURRENT NODE STATUS TABLE 710 715

705

| SOURCE NODE | PRIMARY I/F | SECONDARY I/F |
|---|---|---|
| LCC 120-1/RE 325-1 | X | |
| LCC 120-1/FPC 310-1 | X | |
| LCC 120-1/FPC 310-2 | X | |
| LCC 120-2/RE 325-1 | | X |
| LCC 120-2/RE 310-1 | | X |
| LCC 120-2/RE 310-2 | | X |

ALTERNATE NODE STATUS TABLE

905

| SOURCE NODE | PRIMARY I/F | SECONDARY I/F |
|---|---|---|
| LCC 120-1/RE 325-1 | | X |
| LCC 120-1/FPC 310-1 | | X |
| LCC 120-1/FPC 310-2 | | X |
| LCC 120-2/RE 325-1 | X | |
| LCC 120-2/RE 310-1 | X | |
| LCC 120-2/RE 310-2 | X | |

MERGED NODE STATUS TABLE

905

| SOURCE NODE | PRIMARY I/F | SECONDARY I/F |
|---|---|---|
| LCC 120-1/RE 325-1 | X | X |
| LCC 120-1/FPC 310-1 | X | X |
| LCC 120-1/FPC 310-2 | X | X |
| LCC 120-2/RE 325-1 | X | X |
| LCC 120-2/RE 310-1 | X | X |
| LCC 120-2/RE 310-2 | X | X |

ALTERNATE NODE STATUS TABLE 910 915 905

| SOURCE NODE | PRIMARY I/F | SECONDARY I/F |
|---|---|---|
| LCC 120-1/RE 325-1 | | X |
| LCC 120-1/FPC 310-1 | | X |
| LCC 120-1/FPC 310-2 | | X |
| LCC 120-2/RE 325-1 | | |
| LCC 120-2/RE 310-1 | | |
| LCC 120-2/RE 310-2 | | |

MERGED NODE STATUS TABLE 910 915 905

| SOURCE NODE | PRIMARY I/F | SECONDARY I/F |
|---|---|---|
| LCC 120-1/RE 325-1 | X | X |
| LCC 120-1/FPC 310-1 | X | X |
| LCC 120-1/FPC 310-2 | X | X |
| LCC 120-2/RE 325-1 | | X |
| LCC 120-2/RE 310-1 | | X |
| LCC 120-2/RE 310-2 | | X |

CURRENT NODE STATUS TABLE
(MASTER CIP AND BACKUP CIP ONLINE)

1210 1215 1205 1220 1225 1230 1235 1240

| SOURCE NODE | PRIMARY I/F | SECONDARY I/F |
|---|---|---|
| LCC 120-1/RE 325-1 | X | |
| LCC 120-1/RE 325-2 | | X |
| LCC 120-2/RE 325-1 | | X |
| LCC 120-2/RE 325-2 | X | |
| SFC 110-2/RE 225-1 | | X |
| SFC 110-2/RE 225-2 | X | |
| SFC110-3/RE 225-1 | X | |
| SFC 110-3/RE 225-2 | | X |

CURRENT NODE STATUS TABLE (MASTER
CIP OFFLINE / BACKUP CIP ONLINE)

1210 1215 1255 1205 1260 1265 1270 1275 1280

| SOURCE NODE | PRIMARY I/F | SECONDARY I/F | HOP COUNT |
|---|---|---|---|
| LCC 120-1/RE 325-1 | | X | 1 |
| LCC 120-1/RE 325-2 | | X | 0 |
| LCC 120-2/RE 325-1 | | X | 0 |
| LCC 120-2/RE 325-2 | | X | 1 |
| SFC 110-2/RE 225-1 | | X | 0 |
| SFC 110-2/RE 225-2 | | X | 1 |
| SFC110-3/RE 225-1 | | X | 1 |
| SFC 110-3/RE 225-2 | | X | 0 |

DETECTION OF ACTIVE NODES, SAFE NODE REMOVAL CONDITIONS, AND CROSS-CABLING CONDITIONS FOR MAINTENANCE OPERATIONS WITHIN A MULTI-CHASSIS ROUTING MATRIX

RELATED APPLICATION

This application is a continuation of U.S. patent application Ser. No. 12/699,565, filed on Feb. 3, 2010, the disclosure of which is incorporated by reference herein.

BACKGROUND

Communication and computing networks are employing a multi-chassis routing matrix architecture to provide high-speed switching capacity, such as in the multi-terabit and petabit per second range, that permits scalable growth for networks to handle increasing volumes of voice, video and data traffic. Architectural flexibility and modularity are made possible through a multi-chassis routing matrix architecture where switching capacity may be scaled up by adding additional devices to the multi-chassis routing matrix that enable the network to keep pace with growing demands for services, data through-put and a desired Quality of Service (QoS).

SUMMARY

According to one aspect, a method may be performed by a first device connected to a second device via a first network path and a second network path. The first device may include a first node, a master second node and a backup second node. The master second node may be connected to the first node and the second device via the first network path, and the backup second node may be connected to the first node and the second device via the second network path. The method may include receiving, by the first node and via the first network path or via the second network path, a group of packets, from the second device, where each of the packets may include node status information associated with the second device; determining, by the first node, whether the packets are received via only the first network path or are received via only the second network path; generating, by the first node, a first notification that indicates that the master second node can be safely removed when the packets are received via only the second network path; generating, by the first node, a second notification that indicates that the backup second node can be safely removed when the packets are received via only the first network path; generating, by the first node, a third notification that indicates that neither the master second node nor the backup second node can be safely removed when the packets are not received only via the first network path and the packets are not received only via the second network path; and displaying information regarding the first notification, the second notification, or the third notification.

According to another aspect, a system may include a first device connected to a second device, via a first network path and a second network path. The first device may include a first node, a master second node, and a backup second node, where the master second node may be connected to the first node via a first interface and to the second device via the first network path, the backup second node may be connected to the first node via a second interface and to the second device via the second network path. The first node may receive a group of packets from the second device, via the first interface or via the second interface, where each of the packets may include node status information associated with the second device;

retrieve alternate node status information from a memory when the packets are not received only via the first interface and the packets are not received only via the second interface; merge the node status information with the alternate node status information to create merged node status information; determine, from the merged node status information, whether packets can be received via only the first interface or via only the second interface; generate a first notification that indicates that the master second node may be safely removed when packets can be received via only the second interface; generate a second notification that indicates that the backup second node may be safely removed when packets can be received via only the first interface; and display information regarding the first notification and the second notification.

According to yet another aspect, a system may include a master device connected to a slave device, via a first network path and a second network path. The master device may include a master first node connected to a master second node via a primary interface and a backup second node via a secondary interface. The slave device may include a master third node connected to the master second node via the first network path and a backup third node connected to the backup second node via the second network path. The first node may receive a group of packets from the slave device and via the primary interface or via the secondary interface, where each packet of the group of packets may include source node information and hop count information, where the source node information may indicate from which node each of the packets was sent, and where the hop count information may indicate whether a packet, sent from a node on a network path, is received by the master first node via another network path; obtain the source node information and the hop count information from the group of packets; determine, from the source node information, whether each of the packets was received from the master third node or the backup third node; generate a first cross-cabling condition notification when packets, of the group of packets, from the master third node are received with a non-incremented hop count; generate a second cross-cabling condition notification when packets, of the group of packets, from the backup third node are received with an incremented hop count; and display information regarding the first cross-cabling condition notification or the second cross-cabling condition notification.

According to still another aspect, a system may include a first device connected to a second device via a first network path and a second network path. The first device may include a first node, a master second node, and a backup second node, where the master second node may be connected to the first node and to a master third node associated with the second device, via the first network path, and where the backup second node may be connected to the first node and to a backup third node associated with the second device, via the second network path. The system may include means for receiving a group of packets from a set of nodes associated with the second device, where the group of packets include node status information; means for determining whether a safe removal operation is permitted performed on the master second node or the backup second node based on the node status information; means for retrieving alternate node status information, where the alternate node status information is associated with packets received from the second device at a previous point in time; means for determining whether a safe removal operation is permitted for the master second node or the backup second node based on the node status information and the alternate node status information; means for generating a safe removal notification based on a determination that packets can be received via only the first network path or via only the second network path; means for determining whether a cross-cabling condition exists from the node status information, the node status information including source node information, where the source node information indicates from which node each of the packets were sent; and means for generating a cross-cabling condition notification based on a determination that at least one of the packets from the master third node is received via the secondary interface or that at least one of the packets from the backup third node is received via the primary interface.

BRIEF DESCRIPTION OF THE DRAWINGS

FIGS. 7A-7C are diagrams of exemplary current node status tables capable of being used in the network of FIG. 1;

FIGS. 9A-9D are diagrams of exemplary alternate and merged node status tables that are capable of being used in the network of FIG. 1;

FIGS. 12A and 12B are diagrams of current node status tables that are capable of being used in the multi-chassis routing matrix of FIG. 10.

DETAILED DESCRIPTION

Figure 1:
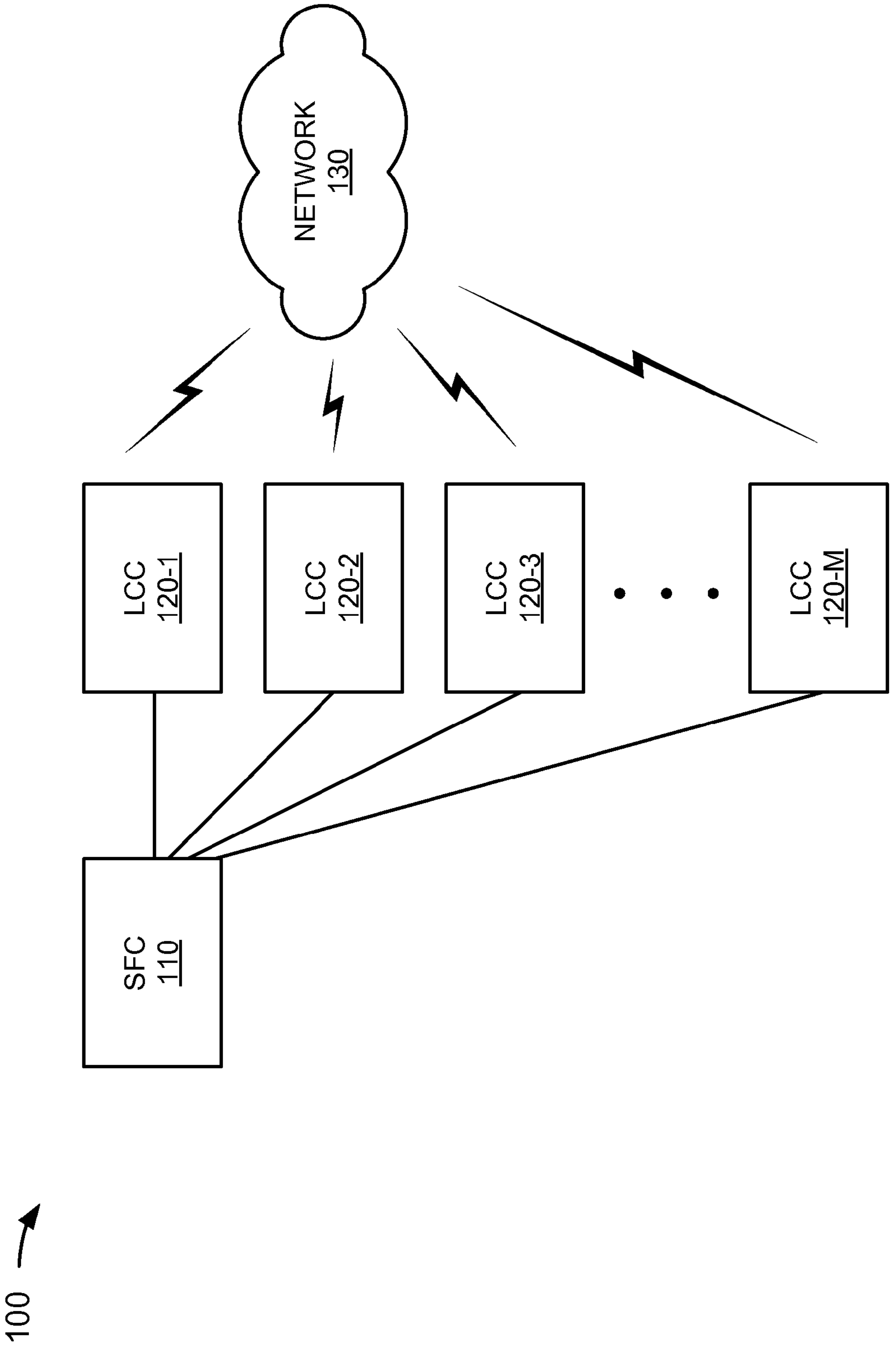
FIG. 1 is a block diagram of an exemplary network in which systems and/or methods, described herein, may be implemented.

The following detailed description refers to the accompanying drawings. The same reference numbers in different drawings may identify the same or similar elements. Also, the following detailed description does not limit the invention.

An implementation described herein may include systems and/or methods that provide for detection of active nodes and cross-cabling conditions within a multi-chassis routing matrix (hereinafter referred to as "routing matrix"), using a technique that can reduce the time to detect and remedy a cross-cabling condition and/or that can enable node repair and/or replacement operations to be performed without powering down devices within the routing matrix. More particularly, performing a cross-cabling detection operation may avoid service disruptions and/or time-consuming troubleshooting operations to determine whether a cross-cabling condition exists and/or to isolate crossed cable(s), if any, to remedy the condition. Moreover, performing a safe removal operation on particular components and/or nodes, within devices that make up a routing matrix, may avoid a loss of data (e.g., dropped packets), avoid service disruptions due to incorrect removal of live components, and/or avoid reduced routing matrix performance and/or capacity caused by powering down particular devices within the routing matrix.

As described herein, a cross-cabling detection operation may include using current node status information, which may contain hop count information, source node information, and/or network path information, obtained from hello packets generated and/or transmitted by routing engine (RE) nodes associated with a line card chassis device (LCC) and/or a switch fabric chassis device (SFC). The current node status information may be used to determine whether a cross-cabling condition exists within the routing matrix and, if the condition exists, to isolate the crossed cables so that the condition may be remedied.

Also, as described herein, a safe removal operation may include using information obtained from hello packets, transmitted among nodes and/or components of router matrix devices (e.g., a LCC, SFC, and/or other device), to determine whether particular nodes and/or components of the SFC and/or the LCC may be removed without incurring a service disruption and/or losing data. For example, current, alternate, and/or merged node status information, generated based on the hello packets, may be used to determine whether a connector interface panel (CIP) associated with a SFC may be safely removed without losing data and/or without performing a power-down operation on the SFC and/or another device.

The term "packet," as used herein, may refer to a packet, a datagram, or a cell; a fragment of a packet, a fragment of a datagram, a fragment of a cell; or another type, arrangement, or packaging of data. Furthermore, the term "node," as used herein, may refer to any component, part, module, and/or element (e.g., RE, CIP, control board, switch fabric, port, interface, physical link, and/or other component) of a device that is included in a routing matrix, such as a LCC, a SFC, and/or some other device, that may or may not generate, transmit, and/or receive hello packets.

Exemplary Network

FIG. 1 is a diagram of an exemplary network in which systems and/or methods, described herein, may be implemented. As illustrated, network 100 may include a SFC 110, LCCs 120-1, 120-2, 120-3, . . . , 120-M (where $M \geqq 1$) (referred to collectively as "LCCs 120" and individually as "LCC 120") and a network 130. Components of network 100 may interconnect via wired and/or wireless connections or links. One SFC 110, a group of LCCs 120 and a single network 130 have been illustrated in FIG. 1 for simplicity. In practice, there may be more SFCs 110, LCCs 120, and/or networks 130. Also, in some instances, one or more components of network 100 may perform one or more functions described as being performed by another one or more of the components of network 100.

SFC 110 may include a data transfer device, such as a gateway, a router, a switch, a firewall, a network interface card (NIC), a hub, a bridge, a proxy server, an optical add-drop multiplexer (OAMD), or some other type of device that processes and/or transfers data traffic. In an exemplary implementation, SFC 110 may include a device that is capable of transmitting information to and/or receiving information from LCCs 120, another SFC 110, and/or another device.

LCC 120 may include a data transfer device, such as a gateway, a router, a switch, a firewall, a NIC, a hub, a bridge, a proxy server, an OAMD, or some other type of device that processes and/or transfers data traffic. In an exemplary implementation, LCC 120 may include a device that is capable of receiving information from and/or transmitting information to SFC 110, other LCCs 120, network 130, and/or another device.

Network 130 may include one or more networks of any type. For example, network 130 may include a local area network (LAN), a wide area network (WAN), a metropolitan area network (MAN), a telephone network (e.g., the Public Switched Telephone Network (PSTN)), or a wireless network, such as the Public Land Mobile Network (PLMN)), an intranet, the Internet, an optical fiber (or fiber optic)-based network, or a combination of networks.

Although FIG. 1 shows exemplary components of network 100, in other implementations, network 100 may contain fewer components, different components, differently arranged components, or additional components than depicted in FIG. 1.

Exemplary Network Device Configuration

Figure 2:
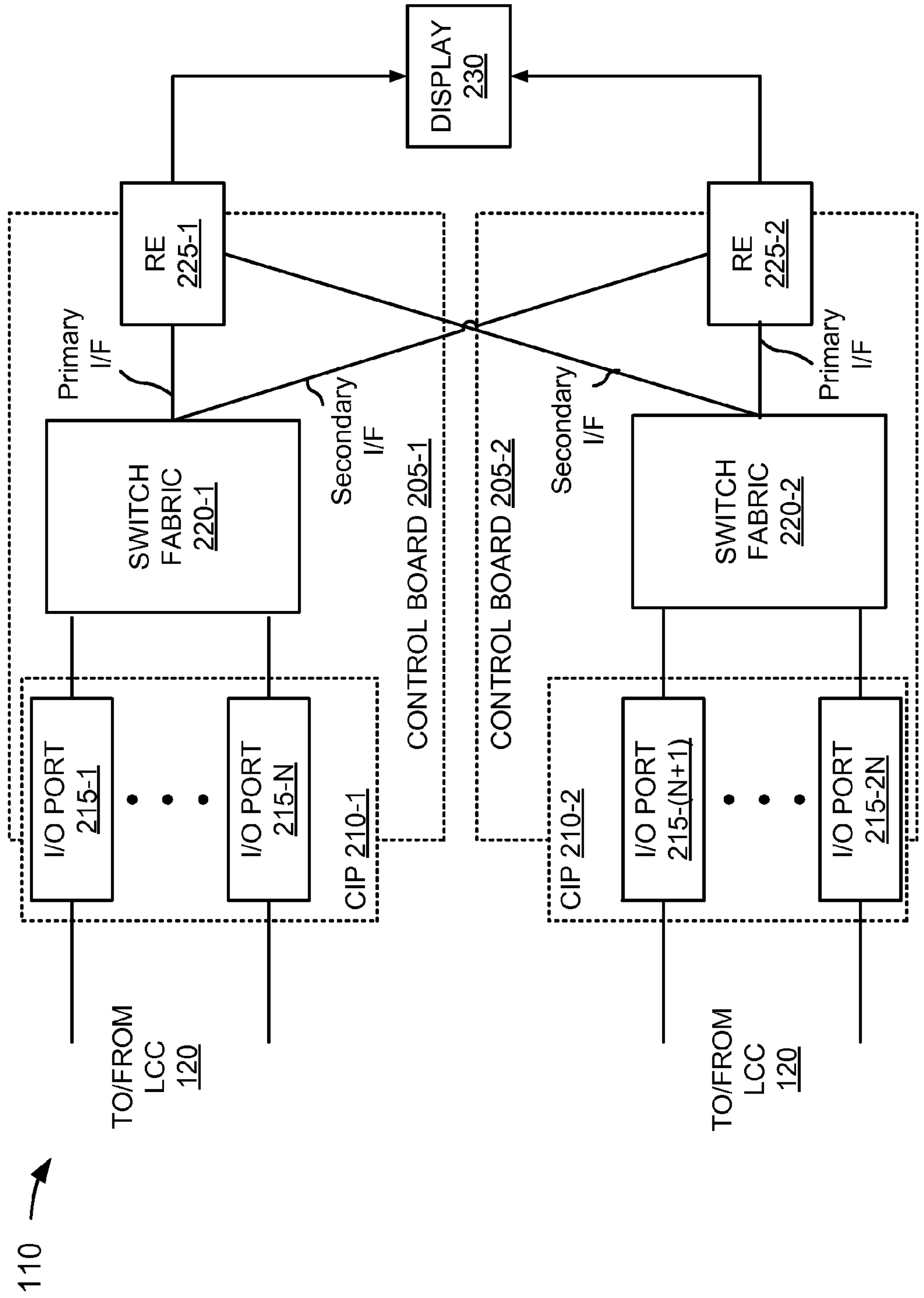
FIG. 2 is a diagram of exemplary components of the switch fabric chassis (SFC) of FIG. 1.

FIG. 2 is a diagram of exemplary components of SFC 110. As illustrated, SFC 110 may include control boards 205-1 and 205-2 (referred to collectively as "control boards 205" and individually as "control board 205"); CIPs 210-1 and 210-2 (referred to collectively as "CIPs 210" and individually as "CIP 210"); a group of I/O ports 215-1 through 215-2N (referred to collectively as "I/O ports 215" and individually as "I/O port 215"); switch fabrics 220-1 and 220-2 (referred to collectively as "switch fabrics 220" and individually as "switch fabric 220"); REs 225-1 and 225-2 (referred to collectively as "REs 225" and individually as "RE 225"); and display 230.

Control board 205-1 may be a master control board (referred to as "master control board 205-1") and may include master CIP 210-1, I/O ports 215-1 through 215-N, switch fabric 220-1 and master RE 225-1. Control board 205-2 may be a backup control board (referred to as "backup control board 205-2") and may include backup CIP 210-2, I/O ports 215-(N+1) through 215-2N, switch fabric 220-2, and backup RE 225-2. Components on a particular control board 205 may be interconnected by internal links. For example, I/O ports 215, corresponding to a particular CIP 210 on a particular control board 205, may be interconnected with RE 225, via switch fabric 220 and an interface, such as a primary internal Ethernet interface (e.g., labeled as "Primary I/F" in FIG. 2), on the particular control board 205.

Master control board 205-1 and backup control board 205-2 may be interconnected via an interface, such as a secondary internal Ethernet interface (e.g., labeled as "Secondary I/F" in FIG. 2). For example, master control board 205-1 may be interconnected, via secondary I/F, between switch fabric 220-1 and backup RE 225-2. Additionally, or alternatively, backup control board 205-2 may be interconnected, via secondary I/F, between switch fabric 220-2 and master RE 225-1.

CIP 210-1 may include a group of I/O ports 215-1 through 215-N and CIP 210-2 may include a group of I/O ports 215-(N+1) through 215-2N. CIPs 210 may be a point of attachment for a physical link and/or may be a point of entry for incoming packets to SFC 110 or a point of exit for outgoing packets from SFC 110. As shown in FIG. 2, CIPs 210 may interconnect with REs 225 via switch fabrics 220 and primary I/F. CIPs 210 may include an indicator, such as one or more light emitting diodes (LEDs), a liquid crystal display (LCD) and/or other indicators, by which the status of CIPs 210 may be displayed to a network administrator associated with network 100. For example, the indicator may include light emitting diodes (LEDs) labeled "OK," "ACTIVE," and/or "FAIL." The "OK" LED may be illuminated if a particular CIP 210 is online and/or otherwise functioning properly; the "ACTIVE" LED may be illuminated if the particular CIP 210 is contemporaneously sending and/or receiving traffic; and the "FAIL" LED may be illuminated if the particular CIP 210 is offline and/or is otherwise not functioning properly.

I/O ports 215 may be a point of attachment for a physical link and/or may include a component to receive, transmit, and/or process packets on a network link or network path. For example, I/O ports 215 may include an Ethernet interface, an optical carrier (OC) interface, an asynchronous transfer mode (ATM) interface, or another type of interface. I/O ports 215 may include a variety of physical interfaces via which packets can be received, can be transmitted, and/or can be received and transmitted. For example, I/O ports 215 may include one or more Ethernet interfaces with 10/100/1000 Base-T copper RJ-45 ports that may connect SFC 110 to LCC 120 using unshielded twisted pair (UTP) Category 5E Ethernet cables. Alternatively, or additionally, I/O ports 215 may include one or more Ethernet interfaces with XFP (e.g., 10-Gigabit Ethernet small form-factor pluggable (SPF)) ports for connecting SFC 110 with another SFC 110.

Switch fabric 220 may include one or more switching planes to facilitate communication among I/O ports 215 and/or REs 225. In one implementation, each of the switching planes may include a single or multi-stage switch of crossbar elements. In another implementation, each of the switching planes may include some other form of switching elements. Switch fabric 220 may also, or alternatively, include processors, memories, and/or paths that permit communication among I/O ports 215 and/or REs 225.

Switch fabric 220 may permit efficient communication between components within a particular control board 205. For example, switch fabric 220 on master control board 205 may include a 10 Gigabit Ethernet switch that may enable master CIP 210 to communicate with master RE 225, via primary I/F. Switch fabric 220 may also permit efficient communication between components on master and backup control boards on SFC 110. For example, switch fabric 220 on master control board 205 may include a 10 Gigabit Ethernet switch that may enable master CIP 210 to communicate with backup RE 225, on backup control board 205, via secondary I/F.

RE 225 may include a processor, a microprocessor, or some form of hardware logic (e.g., an application specific integrated circuit (ASIC) or a field programmable gate array (FPGA)). In one implementation, for example, RE 225 may include a 10 Gigabit Ethernet controller and may include primary I/F ports, secondary I/F ports, and/or other ports. RE 225 may perform high-level management functions for SFC 110. For example, RE 225 may communicate with other networks and systems connected to SFC 110 to exchange information regarding network topology. RE 225 may create a routing table based on the network topology information, create forwarding table(s) based on the routing table, and may forward the forwarding table(s), via CIPs 210, to another SFC 110, and/or LCC 120.

RE 225 may perform control and monitoring functions for SFC 110. For example, RE 225 may instruct nodes within SFC 110 (e.g., REs, CIPs 210, etc.) to periodically generate and/or transmit hello packets to RE 225. RE 225 may receive hello packets from other nodes within SFC 110, may periodically generate hello packets, and/or may transmit the received and/or generated hello packets to another SFC 110 (e.g., master SFC 110), via CIPs 210.

RE 225 may maintain node status information obtained from hello packets and received from other nodes associated of SFC 110, LCC 120, another SFC 110, and/or another device within network 100. RE 225 may receive hello packets and may remove headers, trailers, labels, and/or fields, appended to the hello packets, to obtain node status information. Node status information may include source node address information (e.g., address information of nodes that generate and/or transmit hello packets) and/or network path information (e.g., hop count information associated with received hello packets and/or interface information associated with primary I/F and/or secondary I/F via which hello packets are received). From the node status information, RE 225 may generate node status tables that may be used to perform safe removal operations and/or to detect and remedy a cross-cabling condition.

RE 225 may be a master RE 225 (e.g., master RE 225-1) corresponding to a master control board 205. For example, master RE 225-1 may send information to (e.g., updated routing tables, etc.) and/or may receive information (e.g., hello packets, etc.) from LCC 120, another SFC 110, and/or another device within network 100. Should master RE 225-1 fail, backup RE 225 (e.g., backup RE 225-2) may become master RE 225 while RE 225-1 undergoes repair. In one implementation, SFC 110 may be a master SFC 110 in which master RE 225-1 may control another slave device, such as LCC 120, a slave SFC 110, and/or another device. In another implementation, SFC 110 may be a slave SFC 110 by which master RE 225-1 receives instructions from a master SFC 110. Master RE 225-1 may receive instructions from master SFC 110 and may perform operations in accordance with the received instructions.

Display 230 may include any device capable of receiving and/or reproducing video and/or image data. In one implementation, display 230 may take the form of a computer monitor. In another implementation, display 230 may include an LCD, LED indicators, or the like. Display 230 may be connected to REs 225 and/or control boards 205 and may receive signals for displaying notifications regarding network conditions associated with network 100.

Although FIG. 2 shows exemplary components of SFC 110, in other implementations, SFC 110 may contain fewer components, different components, differently arranged components, or additional components than depicted in FIG. 2. Alternatively, or additionally, one or more components of SFC 110 may perform one or more functions described as being performed by one or more other components of SFC 110.

Figure 3:
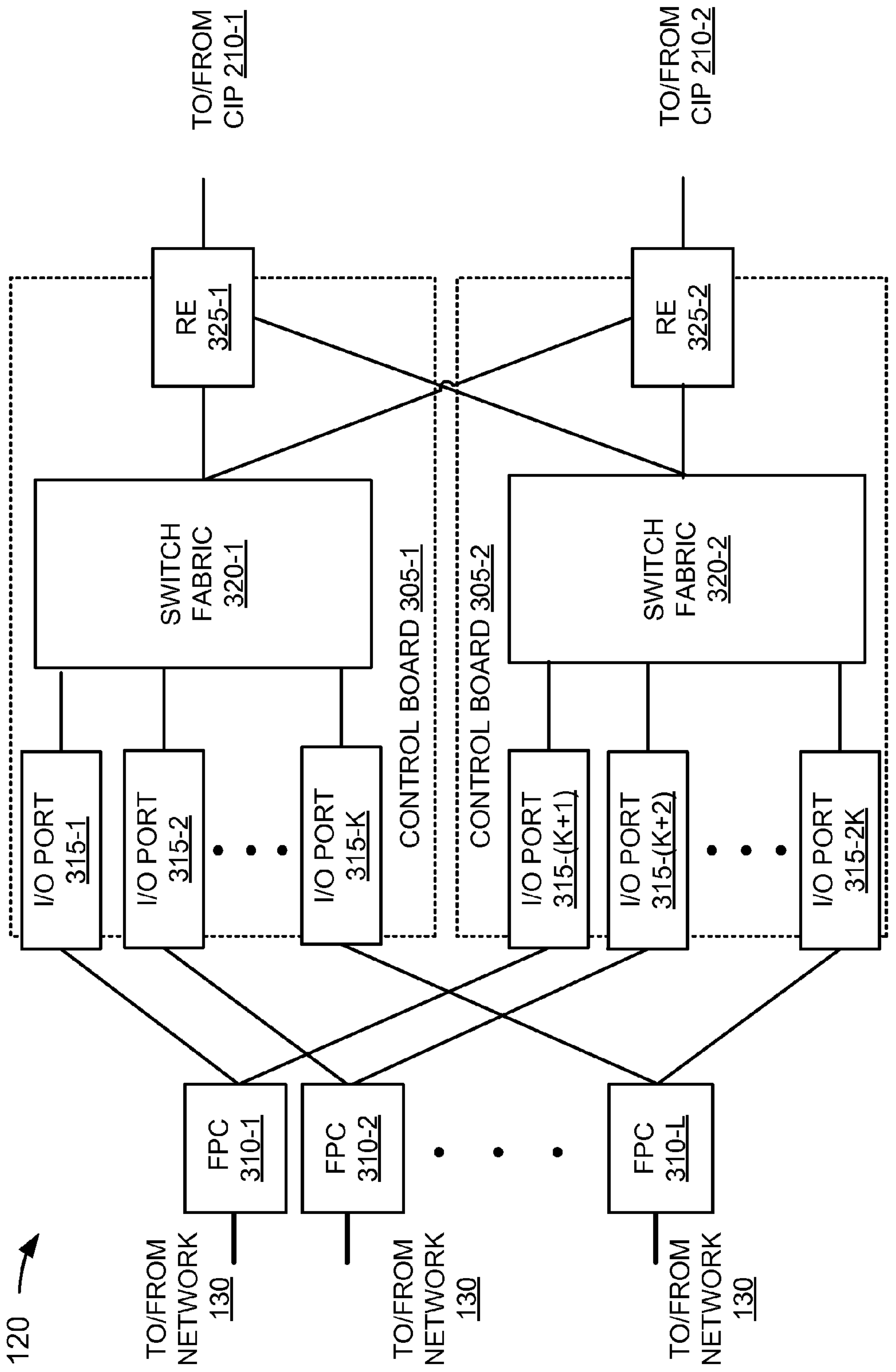
FIG. 3 is a diagram of exemplary components of the line card chassis (LCC) of FIG. 1.

FIG. 3 is a diagram of exemplary components of LCC 120. As illustrated, LCC 120 may include control boards 305-1 and 305-2 (referred to collectively as "control boards 305" and individually as "control board 305"); a group of flexible physical interface card (PIC) concentrators 310-1, 310-2, . . . , 310-L (where L>1) (referred to collectively as "FPCs 310" and individually as "FPC 310"); a group of I/O ports 315-1 through 315-2 K (where K>1) (referred to collectively as "I/O ports 315" and individually as "I/O port 315"); switch fabrics 320-1 and 320-2 (referred to collectively as "switch fabrics 320" and individually as "switch fabric 320"); and REs 325-1 and 325-2 (referred to collectively as "REs 325" and in some instances as "RE 325").

Control board 305-1 may be a master control board (referred to as "master control board 305-1") and may include I/O ports 315-1 through 315-K, switch fabric 320-1, and/or master RE 325-1. Control board 305-2 may be a backup control board (referred to as "backup control board 305-2") and may include I/O ports 315-(K+1) through 315-2K, switch fabric 320-2, and/or backup RE 325-2. Components within a particular control board 305 may be interconnected by internal links. For example, I/O ports 315 on a particular control board 305 may be interconnected with RE 325, via switch fabric 320 on the particular control board.

Master control board 305-1 and backup control board 305-2 may be interconnected via internal links. For example, master control board 305-1 may be interconnected by an internal link between switch fabric 320-1 and backup RE 325-2. Additionally, or alternatively, backup control board 305-2 may be interconnected by an internal link between switch fabric 320-2 and master RE 325-1.

FPCs 310 may include a component or collection of components to receive packets, process incoming and/or outgoing packets, transmit outgoing packets, and/or provide a status of FPCs 310 condition. For example, FPC 310 may include a PIC, a packet forward engine (PFE), an Ethernet interface and/or another type of interface, a central processing unit (CPU), a memory device, and/or an LED indicator. The PIC may include a collection of ports that connect network 130, via physical links, to the PFE. The PFE may include packet processing component(s), switch interface component(s), Internet processor component(s), memory device(s), etc.

FPCs 310 may receive incoming packets from network 130, via the PIC, and may forward the incoming packets to the PFE. The PFE may receive the incoming packets and may forward the incoming packets, through a switch plane in the PFE, to the appropriate I/O ports 315, via one or more Ethernet interfaces, based on the forwarding tables stored in the memory. Alternatively, or additionally, FPCs 310 may receive outgoing packets from I/O ports 315, via one or more Ethernet interfaces, and may forward the outgoing packets to the appropriate port on the PIC for transmission to network 130 based on the forwarding tables.

FPCs 310 may perform certain operations on incoming and/or outgoing packets, such as decapsulation, encapsulation, demultiplexing, multiplexing, queuing, etc. operations, that may facilitate the processing and/or transportation of incoming and/or outgoing packets. FPCs 310 may generate and transmit hello packets to REs 325, via switch fabric 320. FPCs 310 may include LEDs to indicate whether a particular FPC 310 is online or offline.

I/O ports 315 may be a point of attachment for a physical link and/or may include a component to receive, transmit, and/or process packets on a network link or network path. For example, I/O ports 315 may include an Ethernet interface, an OC interface, an ATM interface, or another type of interface. I/O ports 315 may include a variety of physical interfaces via which packets can be received, can be transmitted, and/or can be received and transmitted.

Switch fabric 320 may include one or more switching planes to facilitate communication among I/O ports 315 and/or REs 325. In one implementation, each of the switching planes may include a single or multi-stage switch of crossbar elements. In another implementation, each of the switching planes may include some other form of switching elements. Switch fabric 310 may also, or alternatively, include processors, memories, and/or paths that permit communication among I/O ports 315 and/or REs 325.

Switch fabrics 320 may permit efficient communication between components within a particular control board 305, such as between I/O ports 315 and REs 325. For example, switch fabric 320 on master control board 305 may include a Gigabit Ethernet switch that may enable I/O ports 315 on master control board 305, to communicate with master RE 325-1. Switch fabric 320 may also permit efficient communications between components on master and backup control boards 305. For example, switch fabric 320 on master control board may include a Gigabit Ethernet switch that may enable I/O ports 315 on master control board 305 to communicate with backup RE 325.

RE 325 may include a processor, a microprocessor, or some form of hardware logic (e.g., an ASIC or a FPGA). In one implementation, for example, RE 325 may include a Gigabit Ethernet controller and may include internal Ethernet interface ports and/or other ports. RE 325 may perform high-level management functions for LCC 120. For example, RE 325 may communicate with other networks and systems connected to LCC 120 to exchange information regarding network topology. RE 325 may create a routing table based on the network topology information, create forwarding table(s) based on the routing table, and forward the forwarding table(s) to FPCs 310 and/or another LCC 120 via switch fabrics 320 and I/O ports 315.

RE 325 may also perform control and monitoring functions for LCC 120. For example, RE 325 may instruct nodes within LCC 120 (e.g., FPCs 310) to periodically generate and/or transmit hello packets to RE 325. RE 325 may receive hello packets from other nodes within LCC 120, may periodically generate hello packets, and/or may transmit the received and/or generated hello packets to SFC 110 and/or another LCC 120.

RE 325 may be a master RE 325 (e.g., master RE 325-1) corresponding to a master control board 305. For example, master RE 325-1 may send information to (e.g., updated forwarding tables, etc.) and/or may receive information from FPCs 310 (e.g., hello packets, etc.) and/or other nodes within LCC 120. Should master RE 325-1 fail, backup RE 325 (e.g., RE 325-2) may become master RE 325 while master RE 325 undergoes repair.

Although FIG. 3 shows exemplary components of LCC 120, in other implementations, LCC 120 may contain fewer components, different components, differently arranged components, or additional components than depicted in FIG. 3. Alternatively, or additionally, one or more components of LCC 120 may perform one or more functions described as being performed by one or more other components of LCC 120.

Figure 4:
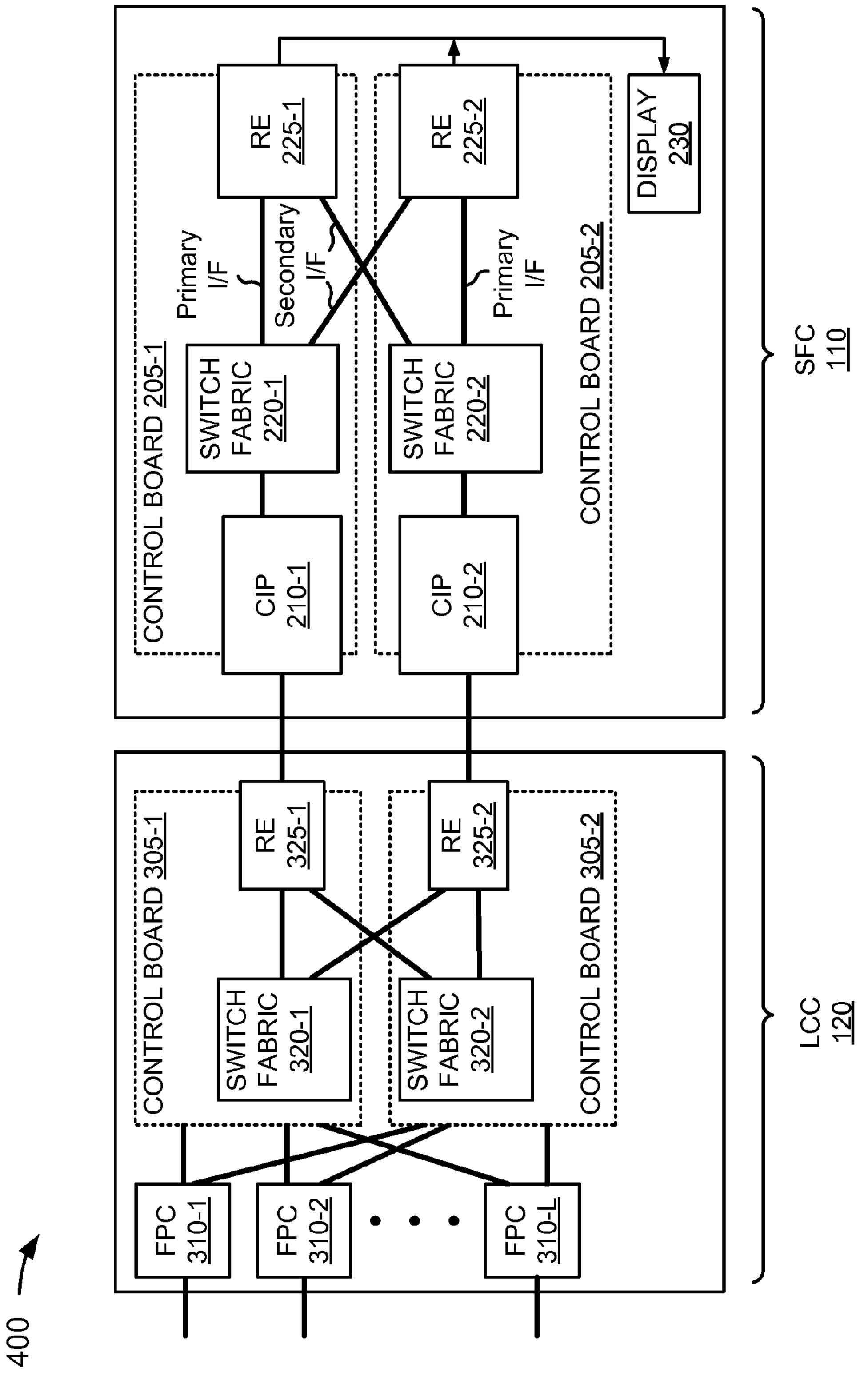
FIG. 4 is a diagram of an exemplary multi-chassis routing matrix.

FIG. 4 is a diagram of an exemplary routing matrix 400. As illustrated, routing matrix 400 may include SFC 110 and LCC 120. LCC 120 and SFC 110 may be interconnected via wired and/or wireless connections or links Master control board 205, associated with SFC 110, and master control board 305, associated with LCC 120, may be connected. For example, assume that a particular control board 205, corresponding to SFC 110, is master control board 205-1 and that a particular control board 305, corresponding to LCC 120, is master control board 305-1. As shown in routing matrix 400, master CIP 210-1, associated with master control board 205-1, may be connected to master RE 325-1, associated with master control board 305-1. Backup control board 205, associated with SFC 110, and backup control board 305, associated with of LCC 120, may be connected. For example, assume that another control board 205, associated with SFC 110, is backup control board 205-2 and that another control board 305, associated with LCC 120, is backup control board 305-2. Backup CIP 210-2, associated with backup control board 205-2, may be connected with backup RE 325-2, associated with backup control board 305-2. When interconnected, in the manner discussed above, SFC 110 may be programmed to act as a master SFC 110 (referred to, in some instances, as "master SFC 110"). Additionally, or alternatively, LCC 120 may be programmed to act as a slave device (e.g., slave LCC 120) that may include executing instructions received from master SFC 110.

The interconnections between LCC 120 and SFC 110, as discussed above, may provide a network path, between nodes associated with LCC 120 and master RE 225-1 and/or backup RE 225-2, over which hello packets may be transported that enable SFC 110 to monitor and control LCC 120. For example, hello packets may be sent from LCC 120 nodes (e.g., control boards 305, FPCs 310, switch fabrics 320, and/or REs 325), to master RE 225-1 via master CIP 210-1 and/or backup CIP 210-2. More particularly, hello packets received by master CIP 210-1 may be sent to master RE 225-1 via switch fabric 220-1 and primary I/F. By contrast, hello packets received by backup CIP 210-2 may be transmitted to master RE 225-1 via switch fabric 220-2 and secondary I/F.

FPCs 310, associated with LCC 120, may send hello packets to master RE 225-1 in a number of ways. FPCs 310 may send hello packets to master RE 225-1 associated with SFC 110 via master control board 305 associated with LCC 120 (e.g., master control board 305-1). In one example, FPCs 310 may send hello packets to master RE 225-1 via switch fabric 320-1, master RE 325-1, master CIP 210-1, switch fabric 220-1, and primary I/F. FPCs 310 may send hello packets to master RE 225-1 via backup control board 305 associated with LCC 120 (e.g., backup control board 305-2). For example, FPCs 310-1 may send hello packets to master RE 225-1 via switch fabric 320-2, backup RE 325-2, backup CIP 210-2, switch fabric 220-2, and secondary I/F. In yet another example, if master RE 325-1 is offline, FPCs 310 may send hello packets to master RE 225-1 via backup control board 305-2, as discussed above, and/or FPCs 310 may send hello packets to master RE 225-1 via switch fabric 320-1, backup RE 325-2, backup CIP 210-2, switch fabric 220-2, and secondary I/F.

Master RE 225-1 may receive hello packets via a number of different nodes associated with SFC 110 and/or LCC 120, different network paths and/or different interfaces (e.g., primary I/F, secondary I/F, and/or other interfaces). Master RE 225-1 may remove headers, trailers, labels, and/or fields from received hello packets to obtain node status information that may be used to perform a safe removal operation (e.g., of CIP 210) and/or to detect a cross-cabling condition (e.g., regarding interconnections between LLC 120 and SFC 110) within routing matrix 400.

REs 325 associated with LCC 120 may send hello packets to master RE 225-1 in a number of ways. In one example, master RE 325-1 may send hello packets to master RE 225-1 via master CIP 210-1, switch fabric 220-1, and primary I/F. In another example, in the event master CIP 210-1 is offline or is otherwise not receiving hello packets, master RE 325-1 may send hello packets to master RE 225-1 via switch fabric 320-1, backup RE 325-2, backup CIP 210-2, switch fabric 220-2, and secondary I/F. In yet another example in which master CIP 210-1 may be offline, master RE 325-1 may send hello packets to master RE 225-1 via switch fabric 320-2, backup RE 325-2, backup CIP 210-2, switch fabric 220-2, and secondary I/F. Master RE 225-1 may receive hello packets from REs 325 via a number of different nodes, different network paths, and/or different interfaces (e.g., primary I/F, secondary I/F, and/or another interface) and may use node status information obtained from received hello packets to perform a safe removal operation and/or to detect a cross-cabling condition within routing matrix 400.

While a number of network paths over which hello packets may be transported are described above for illustration purposes, it should be understood that a number of other network paths, over which hello packets could be transported between LCC 120 and SFC 110 may exist within routing matrix 400. Furthermore, although FIG. 4 shows an exemplary LCC 120 interconnected with an exemplary SFC 110 for simplicity, in practice, routing matrix 400 may contain fewer components, different components, additional components, and/or differently arranged components than shown in FIG. 4. Alternatively, or additionally, one or more components of routing matrix 400 may perform one or more functions described as being performed by one or more other components of routing matrix 400.

Figure 5:
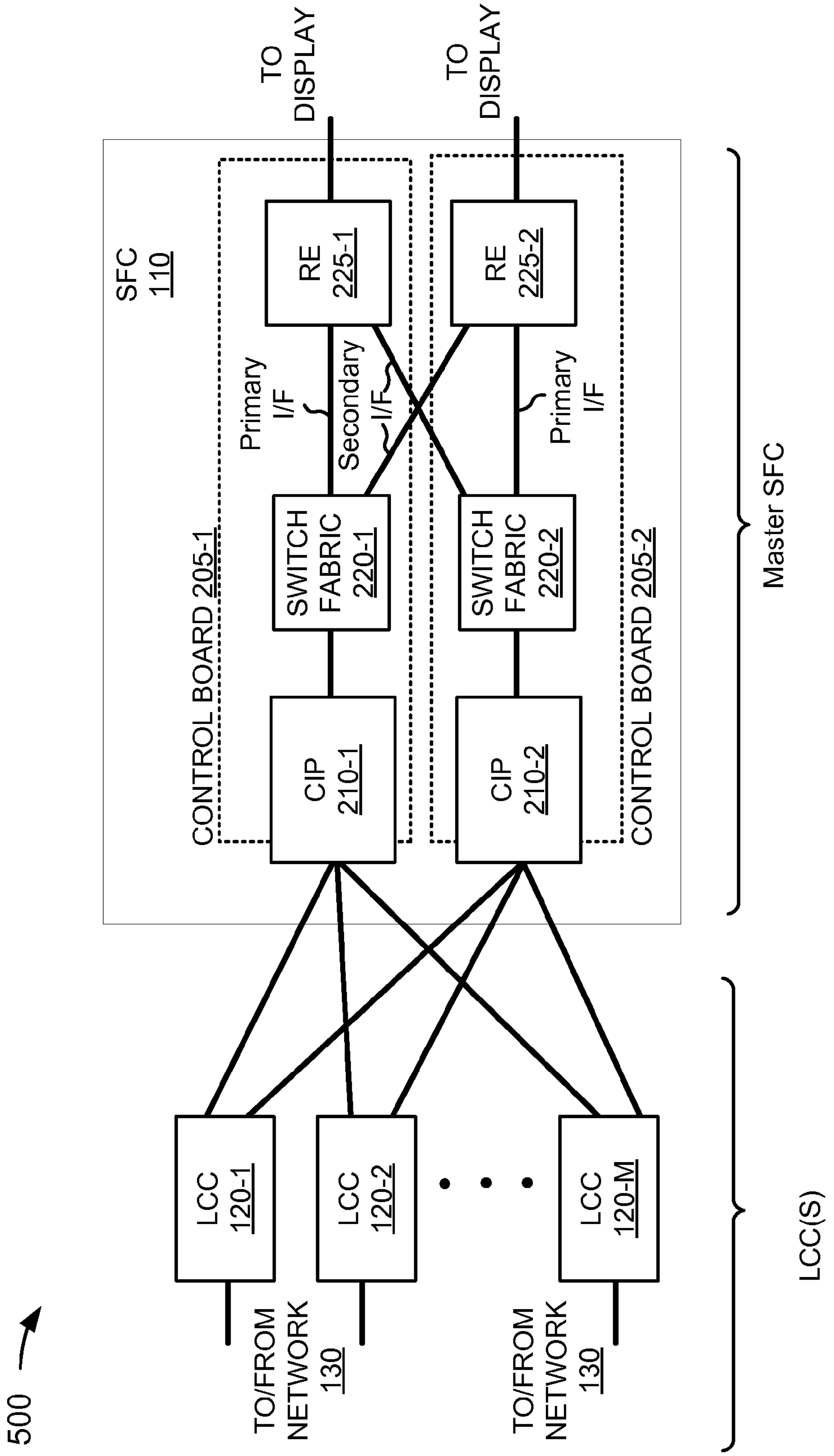
FIG. 5 is a diagram of an exemplary multi-chassis routing matrix with multiple LCCs.

FIG. 5 is a diagram of an exemplary routing matrix 500 with a group of LCCs. As illustrated, routing matrix 500 may include master SFC 110 and LCC 120-1, 120-2, . . . , 120-M (where M≧1). LCCs 120 may be interconnected with master SFC 110 in a manner similar to that described above (in routing matrix 400 of FIG. 4). For example, master control boards 305 associated with LCCs 120 may be connected, via master REs 325, with master control board 205-1 corresponding to master SFC 110 via master CIP 210-1. Additionally, or alternatively, backup control boards 305 associated with LCCs 120 may be connected, via backup REs 325, with backup control board 205-2 corresponding to master SFC 110 via backup CIP 210-2.

Master SFC 110 may perform monitoring and control operations on LCCs 120. For example, master RE 225-1, associated with master SFC 110, may send instructions to nodes associated with LCCs 120 (e.g., FPCs 310, REs 325, and/or other nodes) and/or nodes associated with another SFC 110 (e.g., CIPs 210, REs 225, and/or other nodes) directing that hello packets be periodically generated and/or transmitted to master RE 225-1. Master RE 225-1 may direct, for example, that hello packets be sent from each node in accordance with a particular generation period (e.g., at 1 second intervals or some other interval). In another example, nodes may be pre-programmed with a particular generation period by which hello packets may be generated and/or transmitted to master RE 225-1. In yet another example, nodes may be directed by backup RE 225-2 and/or may be pre-programmed to generate and/or transmit hello packets, at a particular generation period, to backup RE 225-2 if master RE 225-1 is offline or is otherwise not operational.

The hello packets may contain node status information that may include source node information and/or network path information. For example, node status information may be generated by a source node (e.g., RE 325); may be embedded within a hello packet and/or appended to a hello packet in the form of a header, trailer, label, and/or field; and/or may be transmitted to a destination node (e.g., master RE 325-1 and/or backup RE 325-2) within routing matrix 500. Source node information may include an indicator of the particular node (e.g., referred to as a "source node") that generated and/or transmitted a particular hello packet (e.g., RE 325-1, FCS 310-1, RE 225-2, etc.) and/or an address corresponding to the device from which the hello packet was transmitted (e.g., LCC 120-1, SFC 110 or some other device). Network path information may include interface information (e.g., primary I/F, secondary I/F, and/or another interface) via which the hello packet traveled to reach master RE 225 and/or hop count information that may indicate the directness of the network path over which the hello packet was transported to master RE 225, which will be further described below.

Master RE 225-1 may receive hello packets and may store node status information. For example, master RE 225-1 may receive the hello packets and may remove the header, trailer, label, and/or field to obtain source node information associated with the source node from which the hello packets originated and/or network path information associated with the network path taken by each hello packet (e.g., interface information, hop count information, etc.). Master RE 225-1 may store the node status information obtained from the received hello packets and may keep track of nodes from which no hello packets were received.

Nodes, from which hello packets are not being received, may be offline or otherwise inoperable, which may affect performance of routing matrix 500. For example, master RE 225-1 may determine that hello packets have not been received from a particular node, or a collection of nodes, within a particular period (e.g., an alarm period) that may, in one implementation, be approximately equal to or greater than the hello packet generation period discussed above. In another implementation, the alarm period may be a particular factor (e.g., a multiplier) of the generation period. In one example, the alarm period could be programmed at twice the hello packet generation period. In another example, the alarm period could be programmed at three times the generation period or some other factor relating to the generation period. If, within the alarm period, hello packets are not received from a node or collection of nodes, master RE 225-1 may direct the particular device or collection of devices (e.g., LCCs 120) associated with the potentially inoperable nodes to perform a reboot operation. If hello packets are not received by master RE 225-1 from the particular node or collection of nodes after the reboot operation is performed, then master RE 225-1 may determine that a network condition exists and may send a notification to LCCs 120, other SFCs 110, and/or other devices to reroute traffic within routing matrix 500 based on the condition. Alternatively, or additionally, master RE 225-1 may present a notification that a network condition may exist for display on display 230.

Exemplary Processes

Figure 6:
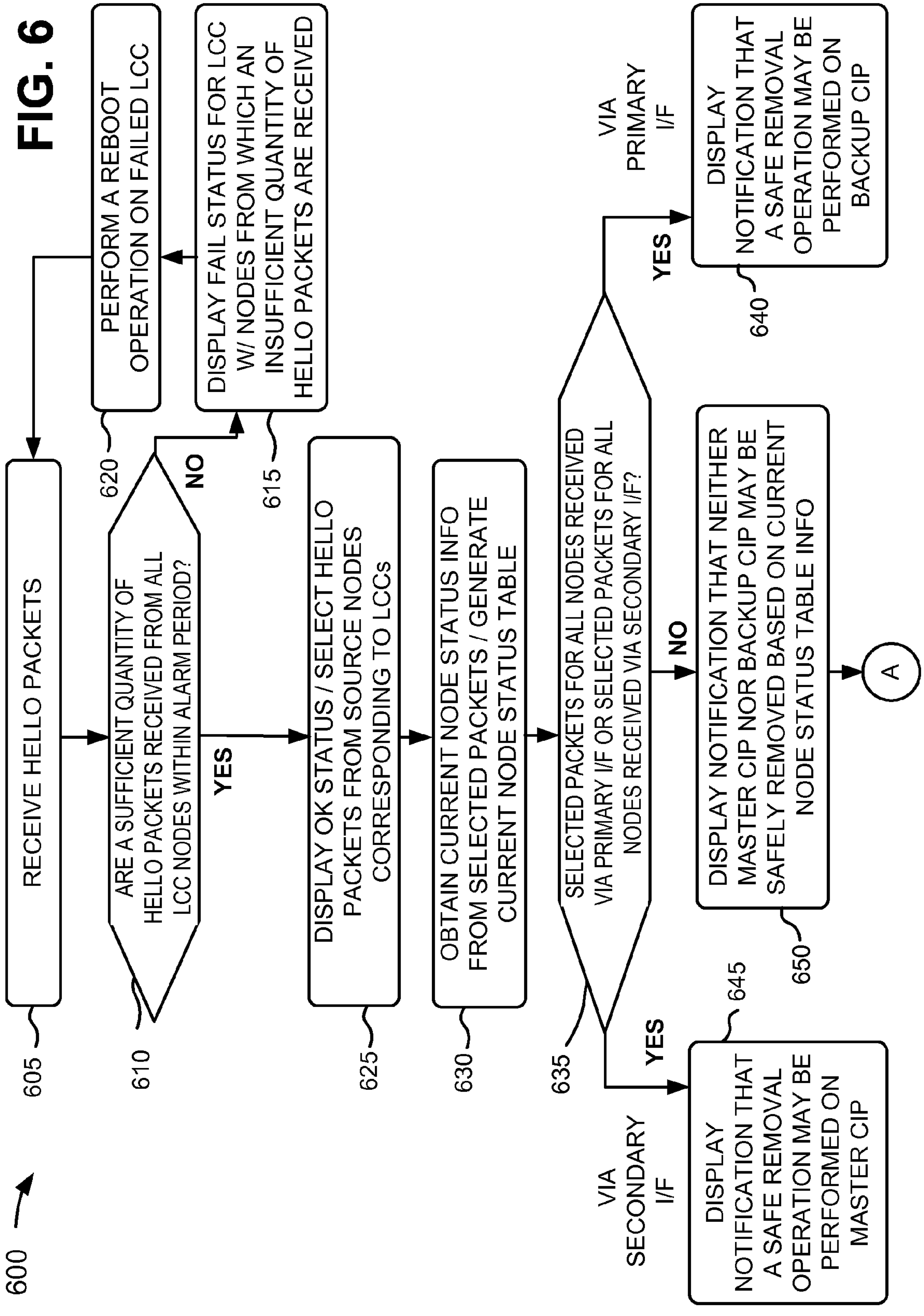
FIG. 6 is a flowchart of an exemplary process for performing a safe removal operation on a connector interface panel (CIP) associated with a SFC.

FIG. 6 is a flowchart of an exemplary process for performing a safe removal operation on CIP 210 associated with SFC 110. In one implementation, process 600 may be performed by one or more LCCs 120 and SFC 110. In another implementation, some or all of process 600 may be performed by a device or collection of devices separate from, or in combination with, SFC 110 and/or LCC 120. FIGS. 7A-7C are diagrams of exemplary current node status tables capable of being used in network 100. A portion of process 600, of FIG. 6, will be discussed below with corresponding references to current node status tables shown in FIGS. 7A-7C.

Process 600, of FIG. 6, may include receiving hello packets (block 605). Assume SFC 110 includes master components, such as master control board 205-1, master CIP 210-1 and master RE 225-1. Assume further that SFC 110 includes backup components, such as backup control board 205-2, backup CIP 210-2 and backup RE 325-2. Assume yet further that three LCCs 120 (e.g., LCC 120-1, LCC 120-2 and LCC 120-3) are interconnected with SFC 110 and that each LCC 120 includes two FPCs 310 (e.g., FPC 310-1 and FPC 310-2), master RE 325-1, and backup RE 325-2. For example, master RE 225-1 may receive hello packets, via primary I/F and/or secondary I/F, from nodes associated with LCCs 120 (e.g., FPCs 310, master RE 325-1, and/or backup RE 325-2) and/or nodes associated with SFC 110 (e.g., master CIP 210-1, backup CIP 210-2, and/or backup RE 225-2).

If an insufficient quantity of hello packets are received from all LCC 120 nodes within an alarm period (block 610—NO), then a fail status may be displayed for LCC 120 with nodes from which an insufficient quantity of hello packets are received (block 615) and a reboot operation may be performed on failed LCC 120 (block 620). Master RE 225-1 may obtain node status information embedded within and/or appended to each received hello packet to determine from which node a particular hello packet was received. More particularly, master RE 225-1 may receive a particular hello packet and may obtain node status information embedded within the hello packet and/or may remove the header, trailer, label and/or field (hereinafter referred to as "header") appended to the hello packet to obtain the node status information. From the node status information, master RE 225-1 may obtain the source node information corresponding to the node that generated and/or transmitted the particular hello packet. Master RE 225-1 may determine if a failed condition, corresponding to LCCs 120, exists within network 100 by determining whether the quantity of hello packets being received, within a particular alarm period, from a particular node or collection of nodes, associated with LCCs 120, is below a particular threshold. In one example, master RE 225-1 may determine that none of the hello packets, from nodes associated with a particular LCC-120 (e.g., FPCs 310, REs 325, and/or other nodes associated with LCCs 120-3), have been received within a particular alarm period (e.g., 3 seconds or some other period), In another example, master RE 225-1 may receive a particular quantity of hello packets from a particular node and may determine that the quantity of hello packets received, within a particular alarm period, is below a particular threshold. In the examples above, the alarm period and/or the particular threshold may be pre-programmed into the memory of master RE 225-1.

Master RE 225-1 may display a fail status for LCC 120 associated with nodes from which an insufficient quantity of hello packets is received. For example, master RE 225-1 may send a notification to CIPs 210 to illuminate a particular LED (e.g., an LED labeled "fail") corresponding to the particular LCC 120 (e.g., LCC 120-3) associated with nodes from which an insufficient quantity of hello packets was received. In another example, master RE 225-1 may present a notification of a fail status regarding a particular LCC 120, from which an insufficient quantity of hello packets were received, for display on display 230.

Master RE 225-1 may instruct failed LCC 120 to perform a reboot operation. For example, master RE 225-1 may send an instruction to master RE 325-1 and/or backup RE 325-2 (e.g., if master RE 325-1 is offline) to perform a reboot operation on failed LCC 120 (e.g., LCC 120-3). Master RE 225-1 may receive additional hello packets and may determine whether a sufficient number of hello packets are received, within the particular alarm period, from nodes associated with failed LCC 120 after the reboot operation.

If hello packets for all LCC 120 nodes are received (block 610—YES), then an ok status may be displayed and hello packets from source nodes corresponding to LCCs 120 may be selected (block 625). Assume that master RE 225-1 has determined, in a manner similar to that discussed above, that LCC 120-3 is in a failed state, that the reboot operation did not correct the failed state, and/or that LCC 120-3 is otherwise offline. For example, master RE 225-1 may receive hello packets via primary I/F, via secondary I/F, or via a combination of primary I/F and secondary I/F. From the source node information obtained from the received hello packets, and, in a manner similar to that discussed above, master RE 225-1 may determine that hello packets were received from all nodes associated with LCCs 120 (e.g., LCC 120-1 and/or LCC 120-2). Master RE 225-1 may send a notification to CIPs 210 to illuminate a particular LED (e.g., an LED labeled "ok") corresponding to the particular LCC 120 (e.g., LCC 120-1 and/or LCC 120-2) with nodes from which hello packets were received. In another example, master RE 225-1 may send an ok status notification, for display on display 230, corresponding to LCCs 120 with nodes from which hello packets are received.

Master RE 225-1 may select hello packets received from nodes associated with LCCs 120. For example, master RE 225-1 may examine the source node information appended to each received hello packet to determine from which node a particular hello packet was received. More particularly, master RE 225-1 may receive hello packets, via primary I/F and/or secondary I/F, and may remove the source address labels from the received hello packets to obtain source node information. The source node information may correspond to the nodes that generated and/or transmitted the hello packets to master RE 225-1. From the source node information, obtained from the received hello packets, master RE 225-1 may select the received hello packets corresponding to nodes associated with LCCs 120 (e.g., FPCs 310, REs 325, and/or other nodes associated with LCCs 120-1 and/or 120-2).

Current node status information may be obtained from selected packets and a current node status table may be generated (block 630). Master RE 225-1 may generate a current node status table that includes node status information associated with each selected packet (e.g., source node information and network path information). For example, as shown in FIG. 7A, current node status table 700 may include source node field 705, primary I/F field 710, and/or secondary I/F field 715. Source node field 705 may include source node information corresponding to a device (e.g., LCC 120-1, LCC 120-2, etc.) and/or a node associated with the device (e.g., RE 325-1, FPC 310-1, FPC 310-2, etc.) from which a particular selected packet was received.

Primary I/F field 710 may include network path information, corresponding to a particular node within source node field 705, which indicates that primary I/F was the interface via which master RE 225-1 received a particular selected packet (e.g., as indicated by an "X" in primary I/F field 710). Secondary I/F field 715 may include network path information, corresponding to a particular node within source node field 705, which indicates that secondary I/F was the interface via which master RE 225-1 received a particular selected packet (e.g., as indicated by an "X" in secondary I/F field 715). Master RE 225-1 may store current node status information in memory (e.g., a memory associated with master RE 225-1).

If selected packets for all LCC 120 nodes are received via primary I/F (block 635—YES, via primary I/F), then a notification that a safe removal operation may be performed on backup CIP may be displayed (block 640). Assume that master RE 225-1 has received selected packets from nodes associated with LCC 120-1 and 120-2 in a manner similar to that described above. Assume further, that current node status information (e.g., source node information and network path information) has been obtained, in a manner similar to that discussed above, from the selected packets received from nodes associated LCC 120-1 and LCC 120-2.

Master RE 225-1 may determine, from current node status information (e.g., as shown in current node status table 700, of FIG. 7A), that selected packets for all nodes associated with LCC 120-1 (e.g., RE 325-1, FPC 310-1, FPC 310-2, etc.) and LCC 120-2 (e.g., RE 325-1, FPC 310-1, FPC 310-2, etc.) were received by master RE 225-1 via primary I/F as indicated by an "X" in primary I/F field 710 corresponding to each node identified in source node field 705 (e.g., as shown by the ellipse 720) (FIG. 7A). In this example, all of the selected packets, which were received by master RE 225-1 via primary I/F, were received via master CIP 210-1. Furthermore, as shown in current node status table 700, of FIG. 7A, none of the selected packets that were received by master RE 225-1, were received via secondary I/F, which may indicated that no select packets were transported via backup CIP 210-2.

A notification to perform a safe removal operation on backup CIP 210-2 may be displayed. For example, master RE 225-1 may send a notification to master CIP 210-1 to illuminate a particular LED (e.g., an LED labeled “active”) as an indication that master CIP 210-1 is active and/or that master CIP 210-1 may not be safely removed while packets are being transported through the device. Master RE 225-1 may present a notification that a safe removal operation may be performed on backup CIP 210-2 for display, on display 230, without losing data (e.g., because no packets are being transported through backup CIP 210-2).

If hello packets for all LCC 120 nodes are received via secondary I/F (block 635—YES, via secondary I/F), then a notification that a safe removal operation may be performed on a master CIP can be displayed (block 645). Assume that current node status information (e.g., source node information and network path information) has been obtained, in a manner similar to that discussed above, from the selected packets received from nodes associated LCC 120-1 and LCC 120-2 and that a current node status table has been generated (e.g., current node status table 730, of FIG. 7B). For example, master RE 225-1 may determine that selected packets for all nodes associated with LCC 120-1 and LCC 120-2 were received, by master RE 225-1, via secondary I/F, as indicated by an “X” in secondary I/F field 715 corresponding to each node identified in source node field 705 (e.g., as shown by the ellipse 735 of FIG. 7B). In this example, all of the selected packets, that were received by master RE 225-1 via secondary I/F, were received via backup CIP 210-2. Furthermore, as shown in current node status table 730, none of the selected packets, which were received by master RE 225-1, were received via primary I/F, which may indicated that none of the selected packets were transported via master CIP 210-1.

A notification to perform a safe removal operation on master CIP 210-1 may be displayed. For example, master RE 225-1 may send a notification to backup CIP 210-2 to illuminate a particular LED (e.g., an LED labeled “active”) as an indication that backup CIP 210-2 is active and/or that backup CIP 210-2 may not be safely removed while packets are being transported through the device. Master RE 225-1 may present a notification that a safe removal operation may be performed on master CIP 210-1 for display, on display 230, without losing data (e.g., because no packets are being transported through master CIP 210-1).

If hello packets for all LCC 120 nodes are not received only via primary I/F and if hello packets for all LCC 120 nodes are not received only via secondary I/F (block 635—NO), then a notification may be displayed that neither the master CIP nor the backup CIP may be safely removed based on current status table information (block 650). Assume that current node status information (e.g., source node information and network path information) has been obtained, in a manner similar to that discussed above, from the selected packets received from nodes associated LCC 120-1 and LCC 120-2 and that a current node status table has been generated (e.g., current node status table 740 of FIG. 7C).

For example, master RE 225-1 may determine that some of the selected packets were received by master RE 225-1, via secondary I/F, as indicated by secondary I/F field 715 (e.g., as shown by the ellipse 745). Furthermore, master RE 225-1 may determine that some of the selected packets were received by master RE 225-1, via primary I/F, as indicated by primary I/F field 710 (e.g., as shown by the ellipse 750). In this example, master RE 225-1 may determine that the selected packets, received via secondary I/F, were received via backup CIP 210-2 and that the selected packets, received via primary I/F, were received via master CIP 210-1.

A notification to perform a safe removal operation on backup CIP 210-2 and/or master CIP 210-1 may not be displayed since both CIPs 210 are active. For example, master RE 225-1 may send a notification, to backup CIP 210-2, to illuminate a particular LED (e.g., an LED labeled “active”) as an indication that backup CIP 210-2 is active and/or that it may not be desirable for backup CIP 210-2 to be removed while packets are being transported through backup CIP 210-2. Additionally, or alternatively, master RE 225-1 may send a notification, to master CIP 210-1, to illuminate a particular LED (e.g., an LED labeled “active”) as an indication that master CIP 210-1 is active and/or that it may not be desirable for master CIP 210-1 to be removed while packets are being transported through master CIP 210-1. In another example, master RE 225-1 may present a notification that a safe removal operation may not be performed on master CIP 210-1 and/or backup CIP 210-2 for display, on display 230, based on current node status information included in table 740 of FIG. 7C.

Figure 8:
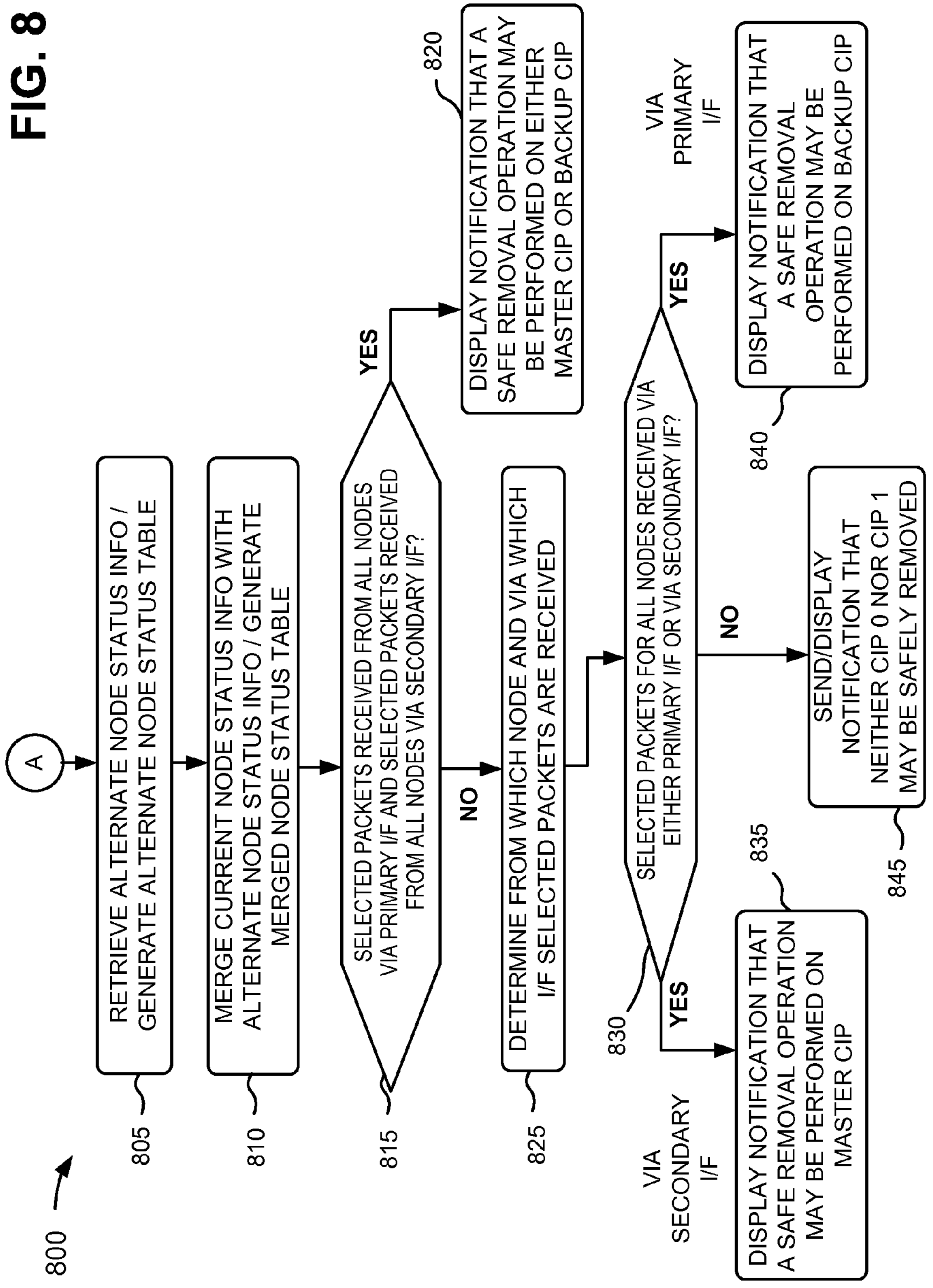
FIG. 8 is a flowchart of another exemplary process for performing a safe removal operation on a CIP associated with a SFC.

FIG. 8 is a flowchart of another exemplary process for performing a safe removal operation on CIP 210 associated with SFC 110. In one implementation, process 800 may be performed by one or more LCCs 120 and SFC 110. In another implementation, some or all of process 800 may be performed by a device or collection of devices separate from, or in combination with, SFC 110 and/or LCC 120. FIGS. 9A-9D are diagrams of exemplary alternate and merged node status tables that are capable of being used in network 100. A portion of process 800, of FIG. 8, will be discussed below with corresponding references to alternate and/or merged node status tables shown in FIGS. 9A-9D.

Process 800 may include generating alternate node status information (block 805). Assume, based on current node status information obtained in a manner similar to that discussed above (with respect to blocks 625-650 of FIG. 6), that master RE 225-1 has determined that CIPs 210 (e.g., master CIP 210-1 and backup CIP 210-2) are active and, therefore, has presented a notification that a safe removal operation may not be performed on CIPs 210. Master RE 225-1 may retrieve, from memory (e.g., a memory associated with master RE 225-1), node status information from a previous point in time. For example, master RE 225-1 may retrieve node status information that was obtained from selected packets, received by master RE 225-1 at a previous point in time, and may generate an alternate node status table, such as alternate node status table 900 of FIG. 9A.

Alternate node status table 900 may include the same fields as current node status tables 700-740 of FIGS. 7A-7C, respectively. For example, alternate node status table 900 may include source node field 905, primary I/F field 910, and/or secondary I/F field 915. Alternate node status table 900 may include the node status information from a previous point in time (hereinafter referred to as “alternate node status information”), where the previous point in time may be a particular period that is greater than the generation period by which hello packets are generated and/or transmitted by nodes within network 100 (e.g., greater than approximately 1 second or some other time period greater than the period by which hello packets are generated).

In a manner similar to that described above (at block 635—NO), master RE 225-1 may determine that selected packets, at the previous point in time, were being received by master RE 225-1 via secondary I/F and via primary I/F as indicated by “Xs” in secondary I/F field 915 (e.g., as shown by the ellipse 920) and primary I/F field 910 (e.g., as shown by the ellipse 925) from corresponding nodes within source node field 905. In this example, master RE 225-1 may determine that the selected packets, received via secondary I/F, were received via backup CIP 210-2. Similarly, master RE 225-1 may determine that the selected packets, received via primary I/F, were received via master CIP 210-1.

Current node status information may be merged with alternate node status information and a merged node status table may be generated (block 810). For example, master RE 225-1 may merge the alternate node status information with the current node status information (e.g., the current node status information illustrated in current node status table 740 of FIG. 7C) to create merged node status information. From the merged node status information, master RE 225-1 may generate a merged node status table (e.g., merged node status table 930 of FIG. 9B).

If selected packets are received from all nodes via primary I/F and if selected packets are received from all nodes via secondary I/F (block 815—YES), then a notification, that a safe removal operation may be performed on either master CIP 210 or backup CIP 210, may be displayed (block 820). For example, master RE 225-1 may determine, from the merged node status information (e.g., as shown in merged node status table 930 of FIG. 9B), that selected packets for all nodes associated with LCC 120-1 and LCC 120-2 are received by master RE 225-1 via both interfaces as indicated by an "X" in primary I/F field 910 and secondary I/F field 915 corresponding to each node identified in source node field 905 (e.g., as shown by ellipses 935 and 940, respectively).

From the determination that selected packets from all nodes are being received via primary I/F and secondary I/F, master RE 225-1 may determine that master CIP 210-1 and backup CIP 210-2 are handling all the traffic received from nodes associated with LCCs 120. Master RE 225-1 may present a notification that a safe removal operation may be performed on either master CIP 210-1 or backup CIP 210-2 for display on display 230.

If selected packets are not received from all nodes via primary I/F and if selected packets are not received from all nodes via secondary I/F (block 815—NO), then nodes from which selected packets are generated and via which interfaces selected packets are received may be determined (block 825). Assume, in this example, that master RE 225-1 retrieves alternate node status information, in a manner similar to that discussed above, and generates an alternate node status table, (e.g., alternate node status table 950 of FIG. 9C). From the alternate node status information, master RE 225-1 may determine that no selected packets were received via primary I/F due to the absence of "Xs" in primary I/F field 910 (e.g., as shown by ellipse 955). However, master RE 225-1 may determine that selected packets were received, from some, but not all nodes, via secondary I/F (e.g., as shown by ellipse 960).

In a manner similar to that discussed above, master RE 225-1 may merge the alternate node status information with the current node status information (e.g., the current node status information obtained from current node status table 740 of FIG. 7C) to create merged node status information. From the merged node status information, master RE 225-1 may generate a merged node status table (e.g., merged node status table 970 of FIG. 9D). From the merged node status table, master RE 225-1 may determine whether selected packets are received from all nodes associated with LCCs 120 via either primary I/F or secondary I/F.

If selected packets for all nodes are received via secondary I/F (block 830—YES, via secondary I/F), then a notification may be displayed that a safe removal operation may be performed on master CIP 210 (block 835). Master RE 225-1 may determine that selected packets are received from all nodes via secondary I/F. For example, from merged node status information (e.g., obtained from merged node status table 970, of FIG. 9D), master RE 225-1 may determine that selected packets are not received from all nodes via primary I/F (e.g., as shown by ellipse 975). Master RE 225-1 may determine, however, that selected packets are received from all nodes via secondary I/F (e.g., as shown by ellipse 980), which may indicate that backup CIP 210-2 is capable of carrying all traffic received from nodes associated with LCCs 120. As a result, master RE 225-1 may present a notification that a safe removal operation may be performed on master CIP 210-1 for display on display 230.

If selected packets for all nodes are received via primary I/F (block 830—YES, via primary I/F), then a notification may be displayed that a safe removal operation may be performed on backup CIP 210 (block 840). Assume, in this example, that the merged node status information, generated in a manner similar to that discussed above, indicates that selected packets are received from all nodes via primary I/F, and that selected packets are not received from all nodes via secondary I/F. For example, master RE 225-1 may determine that master CIP 210-1 is capable of handling the traffic received from all nodes associated with LCCs 120. As a result, master RE 225-1 may present a notification that a safe removal operation may be performed on backup CIP 210-2 for display on display 230.

If selected packets for all nodes are not received via either primary I/F or via secondary I/F (block 830—NO), then a notification may be displayed that neither master CIP 210-1 nor backup CIP 210-2 may be safely removed (block 845). Assume, in this example, that the merged node status information, generated in a manner similar to that discussed above, indicates that selected packets are received, from all nodes associated with LCCs 120, neither via primary I/F nor via secondary I/F. For example, master RE 225-1 may determine that neither master CIP 210-1 nor backup CIP 210-2 are capable of handling the traffic from all nodes associated with LCCs 120. As a result, master RE 225-1 may present a notification that neither master CIP 210-1 nor backup CIP 210-2 may be safely removed.

Figure 10:
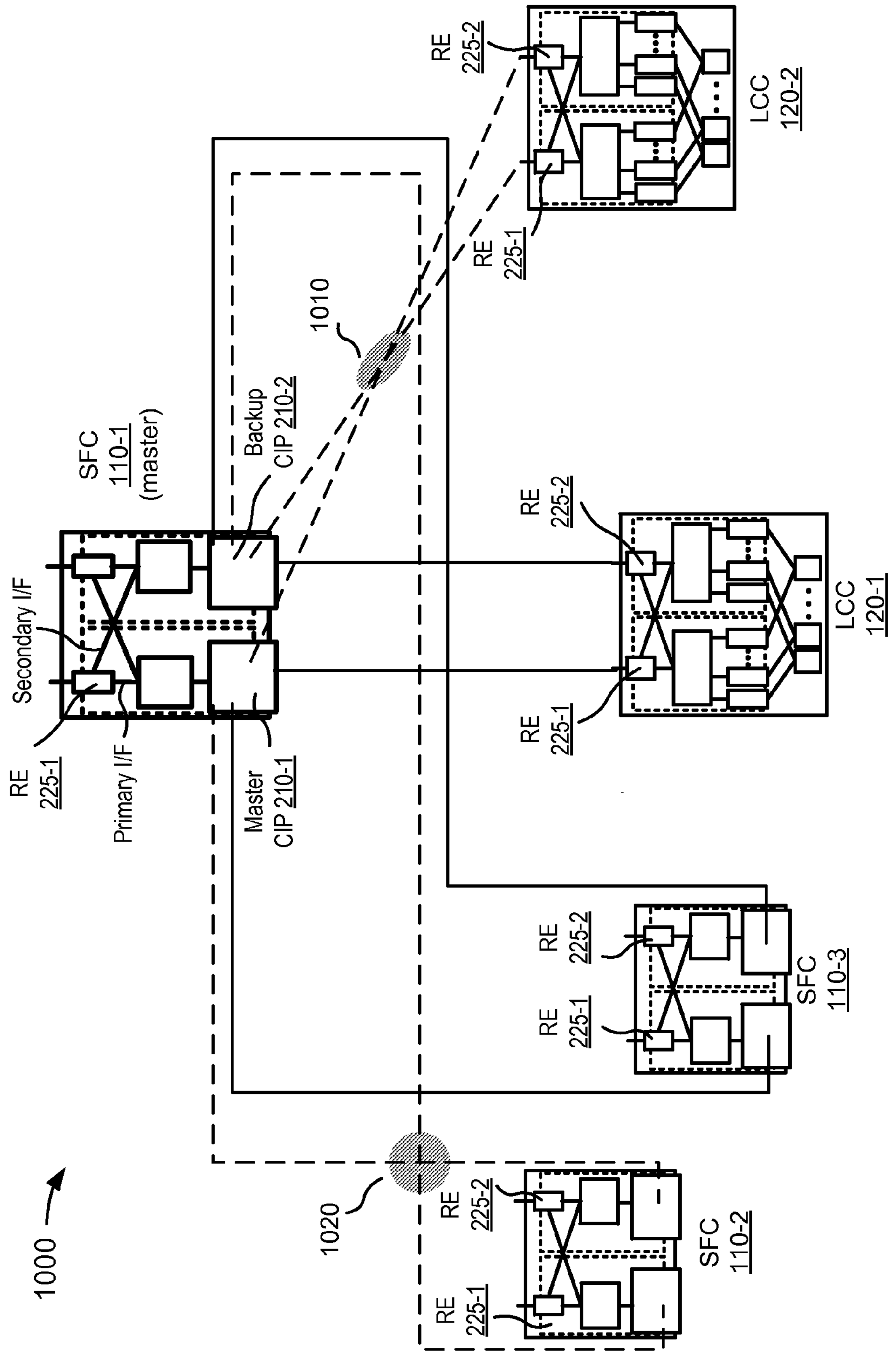
FIG. 10 is a diagram of an exemplary multi-chassis routing matrix with a cross-cabling condition.

FIG. 10 is a diagram of an exemplary routing matrix 1000 with a cross-cabling condition. As illustrated, routing matrix 1000 may include SFCs 110-1 through 110-3 and LCCs 120-1 and 120-2. SFC 110-1 may be a master SFC (referred to herein as "master SFC 110-1") and may be interconnected with SFC 110-2, SFC 110-3, and/or the group of LCCs 120, via wired and/or wireless connections, in a manner similar to that discussed above regarding routing matrix 400 of FIG. 4 and routing matrix 500 of FIG. 5. For example, master control board 205-1, associated with master SFC 110-1, may be interconnected with master control boards 205-1 associated with SFC 110-2 and/or SFC 110-3 as well as master control boards 305-1 associated with LCCs 120. In a similar manner, backup control board 205-2, associated with master SFC 110-1, may be interconnected with backup control boards 205-2 associated with SFC 110-2 and/or SFC 110-3 as well as backup control boards 305-2 associated with LCCs 120. Master control board 205-1 may include master nodes, such as master CIP 210-1, master RE 225-1, and/or other nodes. Master control board 305-1 may include master nodes, such as master RE 325-1 and/or other nodes. Backup control board 205-2 and/or 305-2 may include backup nodes in a similar manner.

Routing matrix 1000 may include a cross-cabling condition between LCC 120-2 and master SFC 110-1. For example, backup control board 305-2, associated with LCC 120-2, may be connected to master control board 205-1 associated with master SFC 110-1 via master CIP 210-1. Additionally, or alternatively, master control board 305-1, associated with LCC 120-2, may be connected to backup control board 205-2 associated with master SFC 110-1 via backup CIP 210-2. The interconnection of the backup control boards with master control boards between master SFC 110-1 and LCC 120-2 may create cross-cabling condition 1010, as shown in FIG. 10. In a similar manner, the interconnection of master control boards 205 with backup control boards 205 associated with master SFC 110-1 and SFC 110-2 may create cross cabling condition 1020.

Cross-cabling conditions may cause a network condition that results in a loss of data and/or a reduction in routing matrix 1000 performance. For example, cross-cabling conditions 1010 and 1020 may cause hello packets to be dropped and/or misrouted within routing matrix 1000 that may hinder master SFCs 110 and/or LCCs 120 ability to perform monitoring and control operations that enable the routing matrix to continue to provide services to network 130.

Figure 11:
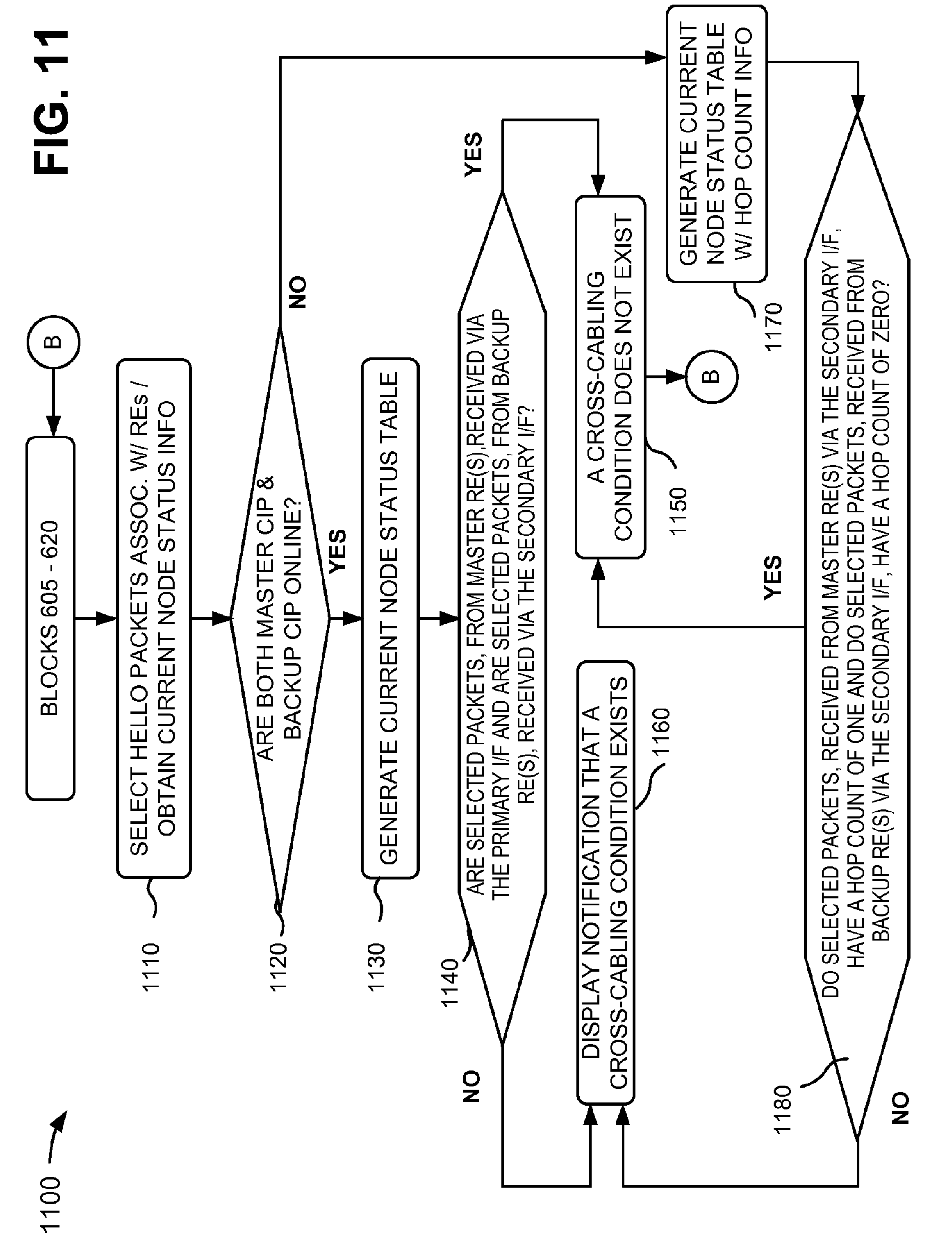
FIG. 11 is a flowchart of an exemplary process for performing a cross-cabling detection operation capable of being performed by a portion of the multi-chassis routing matrix of FIG. 10.

FIG. 11 is flowchart of exemplary process 1100 for performing a cross-cabling detection operation capable of being performed by a portion of routing matrix 1000. In one implementation, process 1100 may be performed by one or more LCCs 120 and SFC 110. In another implementation, some or all of process 1100 may be performed by a device or collection of devices separate from, or in combination with, SFCs 110 and/or LCCs 120. FIGS. 12A and 12B are diagrams of current node status tables 1200 and 1250, respectively, which may be used by routing matrix 1000. A portion of process 1100, of FIG. 11, will be discussed below with corresponding references to current node status tables shown in FIG. 12.

Process 1100, of FIG. 11, may include receiving hello packets and determining whether hello packets are received from all nodes. For example, in a manner similar to that discussed above (at blocks 605—620 of FIG. 6), master RE 225-1, associated with master SFC 110-1, may receive hello packets from nodes associated with LCCs 120 and/or SFCs 110. Master RE 225-1 may obtain source node information embedded within the received hello packets and/or may remove headers appended to the received hello packets to obtain source node information. From the source node information, master RE 225-1 may determine whether hello packets, from all nodes associated with SFCs 110 (e.g., REs 225, CIPs 210-1, and/or other nodes) and/or LCCs 120 (e.g., REs 325, FPCs 310, and/or other nodes), have been received. Furthermore, master RE 225-1 may instruct that a reboot operation be performed on SFC 110 and/or LCC 120 associated with nodes from which no hello packets were received, as described above.

Hello packets associated with REs 225 and 325 may be selected and current node status information may be obtained (block 1110). In this example, assume that hello packets have been received from all nodes and that SFCs 110 and/or LCCs 120 are online and operational. For example, master RE 225-1, associated with master SFC 110-1, may receive hello packets and, in a manner similar to that discussed above (at block 625 of FIG. 6), may select hello packets (hereinafter referred to as "selected packets"), received from REs 225 associated with SFCs 110 (e.g., SFC 110-1 and/or SFC 110-2 of FIG. 10) and/or REs 325 associated with LCCs 120 (e.g., LCC 120-1 and/or LCC 120-2 of FIG. 10), using the source node information obtained from the received hello packets. From the selected packets, current node status information may be obtained in a manner similar to that discussed above (at block 630 of FIG. 6).

If master CIP 210 and backup CIP 210 are online (block 1120—YES), then a current node status table may be generated (block 1130). For example, master RE 225-1 may detect whether selected packets are received via primary I/F and/or secondary I/F. If selected packets are received from primary I/F and secondary I/F, master RE 225-1 may determine that master CIP 210 (e.g., master CIP 210-1) and backup CIP 210 (e.g., backup CIP 210-2), associated with master SFC 110-1, are transporting packets within routing matrix 1000 of FIG. 10. From the determination that master and backup CIPs 210 are online, master RE 225-1 may generate a current node status table (e.g., current node status table 1200 of FIG. 12A). The current node status table may include source node information and/or network path information. For example, in a manner similar to that discussed above (regarding current node status tables 700-740 of FIGS. 7A-7C), current node status table 1200, of FIG. 12A, may include source node field 1205, primary I/F field 1210, and/or secondary I/F field 1215.

If selected packets, from master REs, are received via primary I/F and if selected packets, from backup REs, are received via secondary I/F (block 1140—YES), then a cross-cabling condition may not exist (block 1150). For example, as illustrated in routing matrix 1000, of FIG. 10, master RE 225-1, associated with master SFC 110-1, may receive selected packets from master RE 225-1, associated with SFC 110-3, via master CIP 210-1 and primary I/F associated with master SFC 110-1 (e.g., as indicated by ellipse 1220 of FIG. 12A). Similarly, master RE 225-1, associated with master SFC 110-1, may receive selected packets from backup RE 225-2, associated with SFC 110-3, via backup CIP 210-2 and secondary I/F associated with master SFC 110-1 (e.g., as indicated by ellipse 1225). From the current node status information regarding master RE 225-1 and backup RE 225-2 associated with SFC 110-3, such as that obtained from current node status table 1200, master RE 225-1 associated with master SFC 110-1 may determine that a cross-cabling condition does not exist and master RE 225-1 may receive additional hello packets in a manner similar to that described above (at blocks 605-620 of FIG. 6).

If selected packets, from master REs, are not received via primary I/F or if selected packets, from backup REs, are not received via secondary I/F (block 1140—NO), then a notification that a cross-cabling condition exists may be displayed (block 1160). For example, as illustrated in routing matrix 1000 of FIG. 10, master RE 225-1 associated with master SFC 110-1 may receive selected packets, from master RE 325-1 associated with LCC 110-2, via backup CIP 210-2 and secondary I/F associated with master SFC 110-1 (e.g., as indicated by ellipse 1230 of FIG. 12A). Additionally, or alternatively, master RE 225-1, associated with master SFC 110-1, may receive selected packets, from backup RE 325-2 associated with LCC 120-2, via master CIP 210-1 and primary I/F associated with master SFC 110-1 (e.g., as indicated by ellipse 1235 of FIG. 12A). From the current node status information associated with LCC 120-2 (e.g., as shown in ellipses 1230 and 1235), master RE 225-1 associated with master SFC 110-1 may determine that a cross-cabling condition may exist with respect to LCC 120-2. More particularly, master RE 225-1, associated with master SFC 110-1, may determine that selected packets being received via primary I/F should, instead, be received via secondary I/F regarding backup RE 325-2. Additionally, or alternatively, master RE 225-1 associated with SFC 110-1 may determine that selected packets being received via secondary I/F should, instead, be received via primary I/F regarding master RE 325-1. Master RE 225-1 associated with master SFC 110-1 may present a notification that a cross-cabling condition exists for display on display 230. The notification may notify the network administrator that a cabling correction operation may be performed with respect to interconnections between master SFC 110-1 and LCC 120-2.

In another example, master device may determine that a cross cabling condition exists regarding SFC 110-2 (e.g., as indicated by bracket 1240 of FIG. 12A) in a manner similar to that discussed above and may present a notification that a cross-cabling condition exists for display on display 230.

If both master CIP 210 and backup CIP 210 are not online (block 1120—NO), then a current node status table, with hop count information, may be generated (block 1170). For example, master RE 225-1 associated with master SFC 110-1 may detect whether selected packets were received via primary I/F and/or secondary I/F. If master RE 225-1 determines that selected packets were received from secondary I/F, but were not received from primary I/F, then master RE 225-1 may determine that backup CIP 210 (e.g., backup CIP 210-2) is online and that master CIP 210 (e.g., master CIP 210-1) is offline and/or is otherwise not transporting packets within routing matrix 1000. From the determination that master CIP 210 is offline, master RE 225-1 may generate a current node status table with hop count information (e.g., current node status table 1250 of FIG. 12B).

The current node status table may include source node information and network path information. For example, in a manner similar to that discussed above with respect to current node status tables 700-740 of FIGS. 7A-7C, current node status table 1250, of FIG. 12B, may include source node field 1205, primary I/F field 1210, and/or secondary I/F field 1215. Additionally, or alternatively, current node status table 1250 may include hop count field 1255. Hop count field 1255 may include network path information associated with the "directness" of a particular network path over which a selected packet is transported and received by master RE 225-1. More particularly, the hop count information in hop count field 1255 may be incremented (e.g., incremented from 0 to 1) when a packet is sent from master RE 325 to master SFC 110 via backup RE 325 and backup CIP 210 rather than via master CIP 210. In a similar manner, the hop count information in hop count field 1255 may be incremented when a packet is sent from backup RE 325 to master SFC 110 via master RE 325 and master CIP 210 rather than via backup CIP 210.

For example, as illustrated in routing matrix 1000 of FIG. 10, master RE 325-1 corresponding to LCC 120-1 may be connected to master CIP 210-1 corresponding to master SFC 110-1, and backup RE 325-2 corresponding to LCC 120-1 may be connected to backup CIP 210-2 corresponding to master SFC 110-1. Assume, however, that master CIP 210-1 is offline or is otherwise not receiving selected packets.

Backup RE 325-2 may generate a selected packet, destined for master RE 225-1 associated with master SFC 110-1, with a particular hop count (e.g., a hop count of zero) and may transmit the selected packet to backup CIP 210-2. Master RE 225-1, associated with master SFC 110-1, may receive the selected packet, via backup CIP 210-2 and secondary I/F, with a hop count of zero. Additionally, or alternatively, master RE 325-1 may generate a selected packet, destined for master RE 225-1 associated with master SFC 110-1, with a particular hop count (e.g., a hop count of zero). However, master RE 325-1 may not transmit the selected packet to master RE 225-1 via master CIP 210-1. Master RE 325-1 may, instead, send the selected packet to backup RE 325-2 via switch fabric 320-1 and/or switch fabric 320-2. Backup RE 325-2 may receive the packet, may increment the hop count (e.g., from zero to one) and may transmit the selected packet to backup CIP 210-2. Master RE 225-1 may receive the selected packet, via backup CIP 210-2 and secondary I/F, with an incremented hop count (e.g., a hop count of one).

If selected packets, received from master REs via secondary I/F, have a hop count of one and if selected packets, received from backup REs via secondary I/F, have a hop count of zero (block 1180—YES) then a cross-cabling condition may not exist (block 1150). Assume, as in the example above, that master CIP 210-1 associated with master SFC 110-1 of routing matrix 1000, of FIG. 10, is offline or is otherwise not receiving selected packets. Because master CIP 210-1 is offline, master RE 225-1 may not receive selected packets via primary I/F. From the current node status information corresponding to master RE 325-1 associated with LCC 120-1 (e.g., as indicated by ellipse 1260 of FIG. 12B), master RE 225-1 may determine that a cross-cabling condition does not exist. Specifically, the incremented hop count (e.g., a hop count of 1 as indicated in hop count field 1255) associated with selected packets received from master RE 325-1, via secondary I/F, may indicate that a cross-condition may not exist regarding LCC 120-1.

Additionally, or alternatively, from the current node status information regarding backup RE 325-2 associated with LCC 120-1 (e.g., as indicated by ellipse 1265 of FIG. 12B), master RE 225-1 may determine that a cross-cabling condition does not exist. More particularly, the non-incremented hop count (e.g., a hop count of 0 as indicated in hop count field 1255) associated with selected packets received, via secondary I/F, from backup RE 325-2 may further indicate that a cross-condition may not exist regarding LCC 120-1.

If selected packets, received from master REs via secondary I/F, do not have a hop count of one or if selected packets, received from backup REs via secondary I/F, do not have a hop count of zero (block 1180—NO) then a notification that a cross-cabling condition exists may be displayed (block 1160). Assume, as in the example above, that master CIP 210-1 associated with master SFC 110-1 of routing matrix 1000, of FIG. 10, is offline and/or is otherwise not receiving selected packets. From the current node status information regarding master RE 225-1 associated with SFC 110-2 (e.g., as indicated by ellipse 1270 of FIG. 12B), master RE 225-1 associated with master SFC 110-1 may determine that a cross-cabling condition may exist. Specifically, the non-incremented hop count (e.g., a hop count of 0 as indicated in hop count field 1255) corresponding to the selected packet received, via secondary I/F, from master RE 225-1 may indicate the presence of a crossed cable between SFC 110-2 and master SFC 110-1.

Additionally, or alternatively, from the current node status information regarding backup RE 225-2 associated with SFC 110-2 (e.g., as indicated by ellipse 1275 of FIG. 12B), master RE 225-1 associated with master SFC 110-1 may determine that a cross-cabling condition may exist. More particularly, the incremented hop count (e.g., the hop count of 1 as indicated in hop count field 1255) corresponding to a selected packet received, via secondary I/F, from backup RE 225-2, may further indicate the presence of a crossed cable between SFC 110-2 and master SFC 110-1.

Master RE 225-1, associated with master SFC 110-1, may present a notification that a cross-cabling condition exists within routing matrix 1000 for display on display 230. The notification may notify the network administrator that a cabling correction operation may be performed with respect to interconnections between master SFC 110-1 and SFC 110-2.

In another example, form the current node information associated with LCC 120-2 (e.g., as indicated by bracket 1280 of FIG. 12B), master RE 225-1 associated with master SFC 110-1 may determine that a cross-cabling condition exists in a manner similar to that discussed above and may present a notification that a cross-cabling condition exists within routing matrix 1000 for display on display 230.

Conclusion

Implementations described herein may provide systems and/or methods for detection of active nodes and/or cross-cabling conditions within a routing matrix, which may reduce the time to detect, isolate and/or remedy a cross-cabling condition and/or to enable node repair and/or replacement operations to be performed without powering down devices within the routing matrix. In an exemplary implementation, a master RE, associated with a master SFC, may receive hello packets from nodes associated with LCCs and/or another SFC. The master RE may receive the hello packets and determine from which nodes a sufficient quantity of hello packets have not been received within an alarm period and, based on upon the determination, the master RE by direct that a reboot operation be performed on LCCs associated with nodes from which an insufficient quantity of hello packets were received. The master RE may select hello packets corresponding to LCCs with nodes from which a sufficient quantity of hello packets were received and may obtain current node status information from the selected packets. From the current node status information, the master RE may determine whether a safe removal operation may be performed on a master CIP or a backup CIP associated with the master SFC.

In another implementation, if a safe removal operation cannot be performed, based on current node status information, a master RE, associated with a master SFC, may obtain alternate node status information from the selected packets and may merge the current node status information with the alternative node status information to create merged node status information. From the merged node status information, the master RE may determine whether a safe removal operation may be performed on a master CIP or a backup CIP associated with the master SFC.

In yet another implementation, a master RE associated with a master SFC may obtain current node status information from selected packets received from master REs and/or backup REs associated with LCCs and/or SFCs. The master RE may determine whether both the master CIP and the backup CIP are offline. If the master RE determines that neither the backup CIP nor the master CIP are offline, then master RE may determine whether a cross-cabling condition exists based on interface information obtained from the current node status information. If selected packets, from master REs, are received via a secondary interface and/or if selected packets, from backup REs, are received via a primary interface, then the master RE associated with the master SFC may determine that a cross-cabling condition exists. If the master RE determines that either the master CIP or the backup CIP are offline, then the master RE may obtain hop count information from the current node status information and may use the hop count information, in addition to the interface information, to determine whether a cross-cabling condition exists.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 6, 8, and 11, the order of the blocks may be modified in other embodiments. Further, non-dependent blocks may be performed in parallel. For example, blocks of FIGS. 6, 8 and 11 may be performed in a pipelined manner with multiple instances of the pipeline operating at any given point in time. In other words, nodes associated with a master SFC and nodes associated with LCCs and/or SFCs may be performing a particular operation on a packet or a set of packets while performing another operation on another packet or another set of packets.

Although particular operations have been described as being performed by the master RE, on a master control board, interconnected with a master CIP associated with a master SFC (e.g., with regard to FIGS. 6, 8 and 11), in another implementation, backup RE, on a backup control board, interconnected with a backup CIP associated with a master SFC may perform one or more of the particular operations.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the term "comprises/comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:

receiving, by a first device and via a first network path or a second network path, a plurality of packets from a second device, the second network path being different from the first network path, the second device being different from the first device, the second device including a master first node and a backup first node, the master first node being connected to the first network path, and the backup first node being connected to the second network path;

obtaining, by the first device, node status information from the plurality of packets, the node status information including source node information and hop count information;

determining, by the first device and based on the source node information, whether each packet of the plurality of packets was sent by the master first node or by the backup first node; and providing, by the first device and based on the hop count information, an indication of whether a cross-cabling condition exists, the cross-cabling condition existing when:

one or more packets, of the plurality of packets, sent by the master first node, are received with a non-incremented hop count via the second network path, or one or more packets, of the plurality of packets, sent by the backup first node, are received with an incremented hop count via the second network path.

2. The method of claim 1, where providing the indication includes:

generating a first notification that indicates that the master first node can be safely removed when the plurality of packets are received via only the second network path;

generating a second notification that indicates that the backup first node can be safely removed when the plurality of packets are received via only the first network path;

generating a third notification that indicates that neither the master first node nor the backup first node can be safely removed when the plurality of packets are not received only via the first network path and the plurality of packets are not received only via the second network path; and providing at least one of the first notification, the second notification, or the third notification.

3. The method of claim 1, where the first device includes a first node, a master second node, and a backup second node, where the master second node is connected to the first node and the second device via the first network path, where the backup second node is connected to the first node and the second device via the second network path, where the node status information is associated with a status of the second device, and where the method further comprises:

determining, by the first node and based on the node status information, whether the plurality of packets are received via the first network path or the second network path based on the node status information, and generating the indication based on whether the plurality of packets are received via the first network path or the second network path.

4. The method of claim 3, further comprising:

retrieving, by the first node, alternate node status information from a memory when respective portions of the plurality of packets are received via the first network path and the second network path, the alternate node status information including other node status information from a previous time period;

merging, by the first node, the alternate node status information with the node status information to create merged node status information; and determining, by the first node and based on the merged node status information, that the plurality of packets can be received via the first network path, the providing of the indication including:

providing, by the first node and based on determining that the plurality of packets can be received via the first network path, a notification that a safe removal operation may be performed on the backup second node.

5. The method of claim 4, where the alternate node status information and the node status information include network path information associated with each node, of a plurality of nodes associated with the second device, from which a packet, of the plurality of packets, was received, and where the method further comprises:

determining, based on the merged node status information, that the plurality of packets are received via the first network path, the providing of the indication further including:

providing, based on determining that the plurality of packets are received via the first network path, the notification that the safe removal operation may be performed on the backup second node.

6. The method of claim 4, where the alternate node status information and the node status information include network path information associated with each node, of a plurality of nodes associated with the second device, from which a packet, of the plurality of packets, was received, and where the method further comprising comprises:

determining, based on the merged node status information, that respective portions of the plurality of packets are not received from all nodes, of the plurality of nodes, via the first network path and that the plurality of packets are not received from all nodes, of the plurality of nodes, via the second network path, the providing of the indication further including:

presenting a notification that a safe removal operation may not be performed on either the master second node or the backup second node.

7. The method of claim 1, further comprising:

incrementing the hop count when a packet, of the plurality of packets, is sent to the master first node via the second network path or when a packet, of the plurality of packets, is sent to the master first node via the first network path.

8. A system comprising:

a first device connected to a second device via a first network path and a second network path, the second network path being different from the first network path, the second device including a master first node and a backup first node, the master first node being connected to the first network path, the backup first node being connected to the second network path, and the first device being to:

receive, via the first network path or the second network path, a plurality of packets from the second device, obtain node status information from the plurality of packets, the node status information including source node information and hop count information, determine, based on the source node information, whether each packet of the plurality of packets was sent by the master first node or by the backup first node, and provide, based on the hop count information, a notification that indicates whether a cross-cabling condition exists, the cross-cabling condition existing when one or more packets, of the plurality of packets, sent by the master first node, were received, with a non-incremented hop count, via the second network path or when one or more packets, of the plurality of packets, sent by the backup first node, are received, with an incremented hop count, via the second network path.

9. The system of claim 8, where, when providing the notification, the first device is to:

generate a first notification that indicates that the master first node can be safely removed when the plurality of packets are received via only the second network path, generate a second notification that indicates that the backup first node can be safely removed when the plurality of packets are received via only the first network path, generate a third notification that indicates that neither the master first node nor the backup first node can be safely removed when the plurality of packets are not received only via the first network path and the plurality of packets are not received only via the second network path, and provide at least one of the first notification, the second notification, or the third notification.

10. The system of claim 8, where the first device includes a first node, a master second nod, and a backup second node, where the master second node is connected to the first node and the second device via the first network path, where the backup second node is connected to the first node and the second device via the second network path, where the node status information is associated with a status of the second device, and where the first node is further to:

determine, based on the node status information, whether the plurality of packets are received via the first network path or the second network path based on the node status information.

11. The system of claim 10, where the first node is further to:

retrieve alternate node status information from a memory when the plurality of packets are not received only via the first network path and the plurality of packets are not received only via the second network path, the alternate node status information including other node status information from a previous time, merge the alternate node status information with the node status information to create merged node status information, determine, based on merged node status information, that the plurality of packets can be received via the first network path, and provide an indication that a safe removal operation may be performed on the backup second node based on determining that the plurality of packets can be received via the first network path.

12. The system of claim 11, where the alternate node status information and the node status information include network path information associated with each node, of a plurality of nodes associated with the second device, from which a packet, of the plurality of packets, was received, and where, when merging the alternate node status information with the node status information, the first node is to:

determine that the plurality of packets are received from all nodes of the plurality of nodes via the first network path, the indication, that the safe removal operation may be performed on the backup second node being provided based on determining that the plurality of packets being received from all nodes of the plurality of nodes via the first network path.

13. The system of claim 11, where the alternate node status information and the node status information include network path information associated with each node, of a plurality of nodes associated with the second device, from which a packet, of the plurality of packets, was received, and where the first node is further to:

determine that the plurality of packets are not received from all nodes, of the plurality of nodes, via the first network path and that the plurality of packets are not received from all nodes, of the plurality of nodes, via the second network path; and provide a notice that the safe removal operation may not be performed on either the master second node or the backup second node.

14. A system comprising:

a master device connected to a slave device via a first network path and a second network path, the master device including a master first node that is connected to a master second node via a primary interface and that is connected to a backup second node via a secondary interface, the slave device including a master third node that is connected to the master second node via the first network path and that is connected to a backup third node, via the second network path, the backup third node being connected to the backup second node, and the master first node being to:

receive a plurality of packets from the slave device and via the primary interface or via the secondary interface, each packet, of the plurality of packets, including source node information and hop count information, the source node information indicating from which node each of the plurality of packets was sent, and the hop count information indicating whether a packet is received by the master first node, obtain the source node information and the hop count information from the plurality of packets, determine, from the source node information, whether each packet of the plurality of packets was received from the master third node or the backup third node, and provide, for display, a notification based on whether each packet of the plurality of packets was received from the master third node or the backup third node.

15. The system of claim 14, where, when providing the notification, the master first node is to:

generate a first cross-cabling condition notification when packets, of the plurality of packets, from the master third node are received with a non-incremented hop count, generate a second cross-cabling condition notification when packets, of the plurality of packets, from the backup third node are received with an incremented hop count, generate a third cross-cabling condition notification when packets, of the plurality of packets, from the master third node are received, with an incremented hop count, via the primary interface, generate a fourth cross-cabling condition notification when packets, of the plurality of packets, from the backup third node are received, with a non-incremented hop count, via the primary interface, and provide, for display, information associated with at least one of the first cross-cabling condition notification, the second cross-cabling condition notification, the third cross-cabling condition notification or the fourth cross-cabling condition notification.

16. The system of claim 15, where the master first node is further to:

generate the third cross-cabling condition notification when at least one of the plurality of packets from the master third node is received via the secondary interface, or generate the fourth cross-cabling condition notification when at least one of the plurality of packets from the backup third node is received via the primary interface.

17. The system of claim 16, where the plurality of packets further include node status information, and where the master first node is further to:

obtain the node status information from the plurality of packets, retrieve alternate node status information from a memory when the plurality of packets are not received only via the primary interface and the plurality of packets are not received only via the secondary interface, merge the node status information with the alternate node status information to create merged node status information, determine, from the merged node status information, whether the plurality of packets can be received via only the primary interface or via only the secondary interface, generate a first safe removal notification regarding the master second node when the plurality of packets can be received via only the secondary interface, generate a second safe removal notification regarding the backup second node when the plurality of packets can be received via only the primary interface, and provide, for display, information associated with the first safe removal notification or the second safe removal notification.

18. The system of claim 16, where the master device includes a backup first node, where the backup first node is connected to the backup second node via the primary interface and is connected to the master second node via the secondary interface, and where the backup first node is further to:

generate a fifth cross-cabling condition notification when at least one of the plurality of packets from the master third node is received via the primary interface, generate a sixth cross-cabling condition notification when at least one of the plurality of packets from the backup third node is received via the secondary interface, and provide, for display, information associated with the fifth cross-cabling condition or the sixth cross-cabling condition.

19. The system of claim 14, where the hop count is incremented when a packet, of the plurality of packets, is sent from the master third node to the master first node via the second network path, or when a packet, of the plurality of packets, is sent from the backup third node to the master first node via the first network path.

20. The system of claim 14, where the master first device is further to:

determine whether the plurality of packets are received via only the primary interface or are received via only the secondary interface, generate a safe removal notification regarding the master second node when the plurality of packets are received via only the secondary interface, and provide, for display, information associated with the safe removal notification.

* * * * *

UNITED STATES PATENT AND TRADEMARK OFFICE

CERTIFICATE OF CORRECTION

PATENT NO. : 8,498,200 B2
APPLICATION NO. : 13/466770
DATED : July 30, 2013
INVENTOR(S) : Kaushik Das et al.

It is certified that error appears in the above-identified patent and that said Letters Patent is hereby corrected as shown below:

In the Claims:

Column 27, claim 10, line 32 should read: “node, and a backup second node,”

Signed and Sealed this
Seventeenth Day of September, 2013

Teresa Stanek Rea
*Deputy Director of the United States Patent and Trademark Office*